(12) United States Patent
Hattori et al.

(10) Patent No.: US 9,176,806 B2
(45) Date of Patent: Nov. 3, 2015

(54) COMPUTER AND MEMORY INSPECTION METHOD

(71) Applicant: Hitachi, Ltd., Tokyo (JP)

(72) Inventors: Naoya Hattori, Yokohama (JP); Toshiomi Moriki, Kokubunji (JP)

(73) Assignee: HITACHI, LTD., Tokyo (JP)

(*) Notice: Subject to any disclaimer, the term of this patent is extended or adjusted under 35 U.S.C. 154(b) by 236 days.

(21) Appl. No.: 13/888,670

(22) Filed: May 7, 2013

(65) Prior Publication Data

US 2014/0059389 A1 Feb. 27, 2014

(30) Foreign Application Priority Data

Aug. 24, 2012 (JP) ................... 2012-185505

(51) Int. Cl.
*G06F 11/00* (2006.01)
*G06F 11/07* (2006.01)
*G06F 11/20* (2006.01)

(52) U.S. Cl.
CPC ............ *G06F 11/079* (2013.01); *G06F 11/073* (2013.01); *G06F 11/0724* (2013.01); *G06F 11/0772* (2013.01); *G06F 11/202* (2013.01)

(58) Field of Classification Search
CPC .................... G06F 11/0724–11/0772
See application file for complete search history.

(56) References Cited

U.S. PATENT DOCUMENTS

| | | | |
|---|---|---|---|
| 6,480,982 B1 | 11/2002 | Chan et al. | |
| 7,328,315 B2 | 2/2008 | Hillier, III et al. | |
| 8,176,250 B2 * | 5/2012 | Shidla et al. | 711/118 |
| 2013/0060996 A1 * | 3/2013 | Berke | 711/105 |
| 2013/0326293 A1 * | 12/2013 | Muralimanohar et al. | 714/718 |

FOREIGN PATENT DOCUMENTS

| | | | |
|---|---|---|---|
| JP | 2000-293391 A | 10/2000 | |
| JP | 2007-140920 A | 6/2007 | |
| JP | 2012-103999 A | 5/2012 | |

OTHER PUBLICATIONS

INTEL, Intel 64 and IA-32 Architectures Software Developer's Manual, vol. 3A: System Programming Guide, Part 1, Chapter 15.6, Chapter 15.9.3, Jun. 2009.

* cited by examiner

Primary Examiner — Jason Bryan
(74) Attorney, Agent, or Firm — Volpe and Koenig, P.C.

(57) ABSTRACT

In a memory inspection in a computer installing a x86 CPU, system software related to low-frequent processing is prevented from going down, and the suppression of performance degradation and the avoidance of a reduction in memory capacity by the memory inspection is realized. The computer having a processor, a memory, and an I/O device. The memory stores a system software realizing a system control unit, and an inspection program realizing an inspection unit. The processor has a memory fault notifying unit notifying the system control unit of a fault address. The system control unit includes an adjustment unit that determines whether the inspection program needs to be executed, or not, based on the type of event occurring, plural event processing units processing the event by using different storage areas of the memory, a fault recording unit recording the memory fault, and an event processing unit selector.

12 Claims, 19 Drawing Sheets

FIG. 4

MEMORY MAP 200

| INITIAL MEMORY ADDRESS (410) | SIZE (420) | PROCESSING CONTENT IDENTIFICATION INFORMATION (430) | |
|---|---|---|---|
| | | EVENT IDENTIFIER (440) | EVENT PROCESSING UNIT IDENTIFIER (450) |
| 0xC0001000 | 0x05000 | CREATION OF VIRTUAL MACHINE | COMPLETE EVENT PROCESSING UNIT |
| 0xC0006000 | 0x01000 | CREATION OF VIRTUAL MACHINE | DEGENERACY EVENT PROCESSING UNIT |
| 0xC0010000 | 0x20000 | MIGRATION | COMPLETE EVENT PROCESSING UNIT |
| 0xC0030000 | 0x01000 | MIGRATION | DEGENERACY EVENT PROCESSING UNIT |
| 0xD0000000 | 0x3D000 | OUTPUT OF FAULT LOG | COMPLETE EVENT PROCESSING UNIT |
| 0xD003D000 | 0x03000 | OUTPUT OF FAULT LOG | DEGENERACY EVENT PROCESSING UNIT |
| ⋮ | ⋮ | ⋮ | ⋮ |

FIG. 5

INSPECTION NECESSITY MAP 380

| EVENT IDENTIFIER (440) | INSPECTION NECESSITY (465) |
|---|---|
| CREATION OF VIRTUAL MACHINE | NECESSARY |
| LIVE MIGRATION OF VIRTUAL MACHINE | NECESSARY |
| DATA RECEPTION FROM LAN | UNNECESSARY |
| OUTPUT OF FAULT LOG | NECESSARY |
| ⋮ | ⋮ |

FIG. 6

PRIORITY TABLE 130

| EVENT IDENTIFIER (440) | EVENT PROCESSING UNIT IDENTIFIER (450) | PRIORITY (470) |
|---|---|---|
| CREATION OF VIRTUAL MACHINE | COMPLETE EVENT PROCESSING UNIT | 1 |
|  | DEGENERACY EVENT PROCESSING UNIT | 2 |
| LIVE MIGRATION OF VIRTUAL MACHINE | COMPLETE EVENT PROCESSING UNIT | 1 |
|  | DEGENERACY EVENT PROCESSING UNIT | 2 |
| OUTPUT OF FAULT LOG | COMPLETE EVENT PROCESSING UNIT | 1 |
|  | DEGENERACY EVENT PROCESSING UNIT | 2 |
| ⋮ | ⋮ | ⋮ |

FIG. 7

DEGENERACY TABLE 120

| EVENT IDENTIFIER (440) | EVENT PROCESSING UNIT IDENTIFIER (450) | INSPECTION RESULT (480) |
|---|---|---|
| CREATION OF VIRTUAL MACHINE | COMPLETE EVENT PROCESSING UNIT | NORMAL |
|  | DEGENERACY EVENT PROCESSING UNIT | NORMAL |
| LIVE MIGRATION OF VIRTUAL MACHINE | COMPLETE EVENT PROCESSING UNIT | ABNORMAL |
|  | DEGENERACY EVENT PROCESSING UNIT | NORMAL |
| OUTPUT OF FAULT LOG | COMPLETE EVENT PROCESSING UNIT | ABNORMAL |
|  | DEGENERACY EVENT PROCESSING UNIT | NORMAL |
| ⋮ | ⋮ | ⋮ |

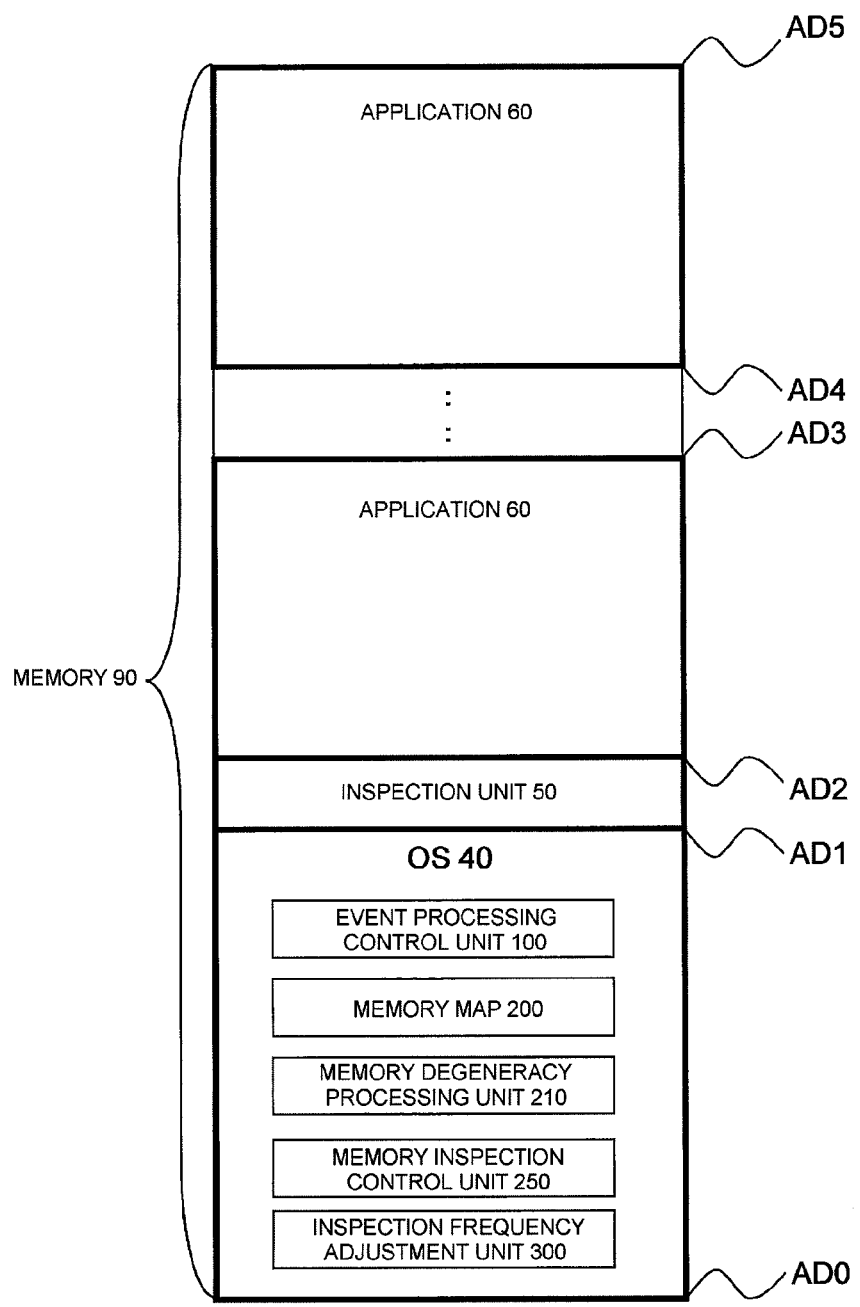

FIG. 17

MEMORY MAP 200

| INITIAL MEMORY ADDRESS /410 | SIZE /420 | PROCESSING CONTENT IDENTIFICATION INFORMATION /430 ||
|---|---|---|---|
| | | EVENT IDENTIFIER /440 | EVENT PROCESSING UNIT IDENTIFIER /450 |
| 0xC0001000 | 0x05000 | START OF APPLICATION | COMPLETE EVENT PROCESSING UNIT |
| 0xC0006000 | 0x01000 | START OF APPLICATION | DEGENERACY EVENT PROCESSING UNIT |
| 0xC0010000 | 0x20000 | OUTPUT TO CLIPBOARD | COMPLETE EVENT PROCESSING UNIT |
| 0xC0030000 | 0x01000 | OUTPUT TO CLIPBOARD | DEGENERACY EVENT PROCESSING UNIT |
| 0xD0000000 | 0x3D000 | OUTPUT OF FAULT LOG | COMPLETE EVENT PROCESSING UNIT |
| 0xD003D000 | 0x03000 | OUTPUT OF FAULT LOG | DEGENERACY EVENT PROCESSING UNIT |
| ⋮ | ⋮ | ⋮ | ⋮ |

FIG. 18

IMPORTANCE MAP 320

| EVENT IDENTIFIER /440 | IMPORTANCE /460 |
|---|---|
| START OF APPLICATION | LOW |
| OUTPUT TO CLIPBOARD | LOW |
| DATA RECEIVE FROM LAN | LOW |
| OUTPUT OF FAULT LOG | HIGH |
| ⋮ | ⋮ |

FIG. 19

TIME TABLE 360

| EVENT IDENTIFIER | PREVIOUS TIME |
|---|---|
| START OF APPLICATION | 2012/06/03 16:24:53 |
| OUTPUT TO CLIPBOARD | 2012/12/20 23:43:18 |
| OUTPUT OF FAULT LOG | — |
| ⋮ | ⋮ |

PRIORITY TABLE 130

| EVENT IDENTIFIER | EVENT PROCESSING UNIT IDENTIFIER | PRIORITY |
|---|---|---|
| START OF APPLICATION | COMPLETE EVENT PROCESSING UNIT | 1 |
| | DEGENERACY EVENT PROCESSING UNIT | 2 |
| OUTPUT TO CLIPBOARD | COMPLETE EVENT PROCESSING UNIT | 1 |
| | DEGENERACY EVENT PROCESSING UNIT | 2 |
| OUTPUT OF FAULT LOG | COMPLETE EVENT PROCESSING UNIT | 1 |
| | DEGENERACY EVENT PROCESSING UNIT | 2 |
| ⋮ | ⋮ | ⋮ |

DEGENERACY TABLE 120

| EVENT IDENTIFIER /440 | EVENT PROCESSING UNIT IDENTIFIER /450 | INSPECTION RESULT /480 |
|---|---|---|
| START OF APPLICATION | COMPLETE EVENT PROCESSING UNIT | NORMAL |
| | DEGENERACY EVENT PROCESSING UNIT | NORMAL |
| OUTPUT TO CLIPBOARD | COMPLETE EVENT PROCESSING UNIT | ABNORMAL |
| | DEGENERACY EVENT PROCESSING UNIT | NORMAL |
| OUTPUT OF FAULT LOG | COMPLETE EVENT PROCESSING UNIT | ABNORMAL |
| | DEGENERACY EVENT PROCESSING UNIT | NORMAL |
| ⋮ | ⋮ | ⋮ |

COMPUTER AND MEMORY INSPECTION METHOD

This application is based upon and claims the benefit of priority from Japanese Patent Application No. 2012-185505, filed on Aug. 24, 2012, the entire contents of which are incorporated herein by reference.

BACKGROUND OF THE INVENTION

1. Field of the Invention

The present invention relates to a technique in which a system controller realized by system software that operates a plurality of programs with the use of computer resources detects a memory fault.

2. Background Art

With an improvement in the performance and function of an open server installing an x86 CPU therein, as a method of effectively using a CPU core installed in the server, a hypervisor providing the function of server virtualization has been extensively used. The hypervisor is system software that creates a plurality of virtual machines by using computer resources such as a CPU, a memory and an I/O device installed in one physical server, and operates an OS and applications on the respective virtual machines.

With the popularization of the multicore CPU, the number of virtual machines created on one physical server tends to increase, and a memory capacity installed in the physical server also tends to increase. With those tendencies, in order to increase the memory capacity, a reduction in the size of a memory element included in a memory module is promoted.

In general, when a size of semiconductor is reduced, data is liable to be garbled due to a disturbance such as cosmic radiation or a failure of the memory element. In order to prevent malfunction caused by data garble, a coding technique using an ECC (error correcting code) disclosed in U.S. Pat. No. 6,480,982, and so on, is applied to a memory controller within the server CPU.

With the use of the ECC, if a correctable error such as a 1-bit error occurs in the read data, the error is corrected at the time of error detection, and the operation of a program can be continued. However, if an uncorrectable error (UE) such as a 2-bit error occurs in the read data, the operation of the program is disturbed.

In the related-art server having the x86 CPU, if the read data has the UE, a fault interrupt for instructing a forced outage is transmitted to all CPU cores within the system. For that reason, all of OSs and applications go down.

On the contrary, Intel Corporation ("Intel" registered in trademark) modifies the specification of fault processing for the CPU as disclosed in Intel, "Intel 64 and IA-32 Architecture Software Developer's Manual June 2009, Volume 3A: System Programming Guide, Part 1", Chapter 15.6, Chapter 15.9.3. In the modified specification, a fault transmission means of a class called "SRAR (software recoverable action required) is added, and a range of the forced outage is restricted by addition of this specification.

In the SRAR, information different for each of the CPU cores is transmitted at the time of the fault interrupt. A memory address at which the UE is held, and information indicating that an execution state (command address) of the program is lost are transmitted to the CPU core that reads the UE. The memory address at which the UE is held, and information indicating that the execution state of the program is valid are transmitted to other CPU cores. For that reason, system software that receives the respective information subjects only the program in which the execution state is lost to forced outage, and can continue the operation of the other programs.

However, a fault is also present in the SRAR. When the system software per se reads the UE, because the system software per se goes down, the other programs operated by the system software also go down.

In order to suppress the occurrence of the UE, the memory controller conducts scrubbing. The "scrubbing" is a function of correcting the correctable error such as the 1-bit error at a timing when the memory is accessed. When data is repetitively garbled by the disturbance such as cosmic radiation, if the error can be corrected at a stage of the 1-bit error, the occurrence of the UE can be suppressed.

However, this method is effective for a storage area frequently referred to, but ineffective for the storage area which is low in reference frequency. For example, the hypervisor has processing low in execution frequency such as start of the virtual machines and live migration. A storage area used at the time of executing those processing low in the execution frequency is low in the reference frequency, and therefore the UE is relatively liable to occur.

Under the circumstances, in order to scrub the storage area low in the reference frequency, there has been known a patrol scrubbing technique in which hardware such as the memory controller cyclically inspects an overall region of the memory regardless of the execution of the program.

However, when the patrol scrubbing is conducted, software processing and patrol scrubbing competes against each other for a storage area, resulting in the degradation of the execution performance of the program. Accordingly, practically, the program execution is prioritized by taking a countermeasure that a cycle of the patrol inspection is sufficiently prolonged. For that reason, even if the patrol scrubbing is conducted, there may occur a case in which UE suppression or UE preceding detection fails, and the system software reads the UE.

As another method for avoiding the UE, memory mirroring disclosed in U.S. Pat. No. 7,328,315, and so on has been also extensively known. The memory mirroring is a redundant technique in which data is held in a memory module of a main system and a memory module of a sub-system.

As usual, data is read from the memory module of the main system. However, if the UE is present in the read result, data is automatically reread from the memory module of the sub-system. For that reason, if data stored in any one of the memory module of the main system and the memory module of the sub-system is safe, the program such as the system software can be prevented from going down.

However, in the memory mirroring, because the available memory capacity is reduced to half, this technique is not suitable for a configuration in which a large number of virtual machines is configured on a single server.

SUMMARY OF THE INVENTION

An object of the present invention is to prevent system software from going down, particularly in low-frequency processing, and realize the suppression of performance degradation and the avoidance of a reduction in memory capacity, in a computer installing an x86 CPU therein.

A typical example of the present invention will be described below. That is, there is provided a computer, including: a processor; a memory connected to the processor; and an I/O device connected to the processor, wherein the memory stores a system software that realizes a system control unit for controlling the overall computer, and an inspection program that realizes an inspection unit for inspecting whether a memory fault is present in the memory, or not, therein, wherein the processor has a memory fault notifying unit that notifies the system control unit of a fault address which is an address of the memory at which the memory fault occurs when detecting the memory fault, in which the system control unit includes: an adjustment unit that determines whether the inspection program needs to be executed, or not, on the basis of the type of an event occurring during the operation of the system control unit; a plurality of event processing units that process the event with the use of different storage areas of the memory; inspection result information for holding results of the memory inspection executed by the inspection unit on the storage areas of the memory used by the respective plurality of event processing units; a fault recording unit that specifies any one of the event processing units using the storage area of the memory including the fault address, and records the memory fault in the specified event processing unit in the inspection result information, if the memory fault is detected by the memory inspection; and an event processing unit selector that selects an event processing unit that processing the event from the plurality of event processing units using the storage area of the memory in which the memory fault does not occur, with reference to the inspection result information.

According to the present invention, because the inspection unit realized by the inspection program is different from the system software executes the memory inspection, even if the memory fault (UE) is present in the storage area of the memory, the system control unit can be prevented from going down. Also, the system control unit can continue the operation without using the storage area including the memory fault. Also, in the present invention, because the event ineffective in the scrubbing and so on is set as the storage area to be inspected, the performance degradation of the memory by the memory inspection can be suppressed. Further, in the present invention, because the redundancy of the memory is unnecessary, a reduction in the memory capacity can be avoided.

BRIEF DESCRIPTION OF THE DRAWINGS

FIG. 4 is an illustrative view illustrating an example of a memory map according to the first embodiment of the present invention;

FIG. 5 is an illustrative view illustrating an example of an inspection necessity map according to the first embodiment of the present invention;

FIG. 6 is an illustrative view illustrating an example of a priority table according to the first embodiment of the present invention;

FIG. 7 is an illustrative view illustrating an example of a degeneracy table according to the first embodiment of the present invention;

FIG. 16 is a diagram illustrating an example of a memory managed by an OS according to the second embodiment of the present invention;

FIG. 17 is an illustrative view illustrating an example of a memory map according to the second embodiment of the present invention;

FIG. 18 is an illustrative view illustrating an example of an importance map according to the second embodiment of the present invention;

FIG. 19 is an illustrative view illustrating an example of a time table according to the second embodiment of the present invention;

FIG. 20 is an illustrative view illustrating an example of a priority table according to the second embodiment of the present invention;

FIG. 21 is an illustrative view illustrating an example of a degeneracy table according to the second embodiment of the present invention;

DESCRIPTION OF PREFERRED EMBODIMENTS

Hereinafter, embodiments of the present invention will be described with reference to the accompanying drawings.
First Embodiment In a first embodiment, a description will be given of an example in which in a computer system where a hypervisor controls a physical computer as a system control unit, a memory inspection is executed on the basis of information indicative of the necessity of a memory inspection set for each of events.
(Hardware Configuration)

Figure 1:
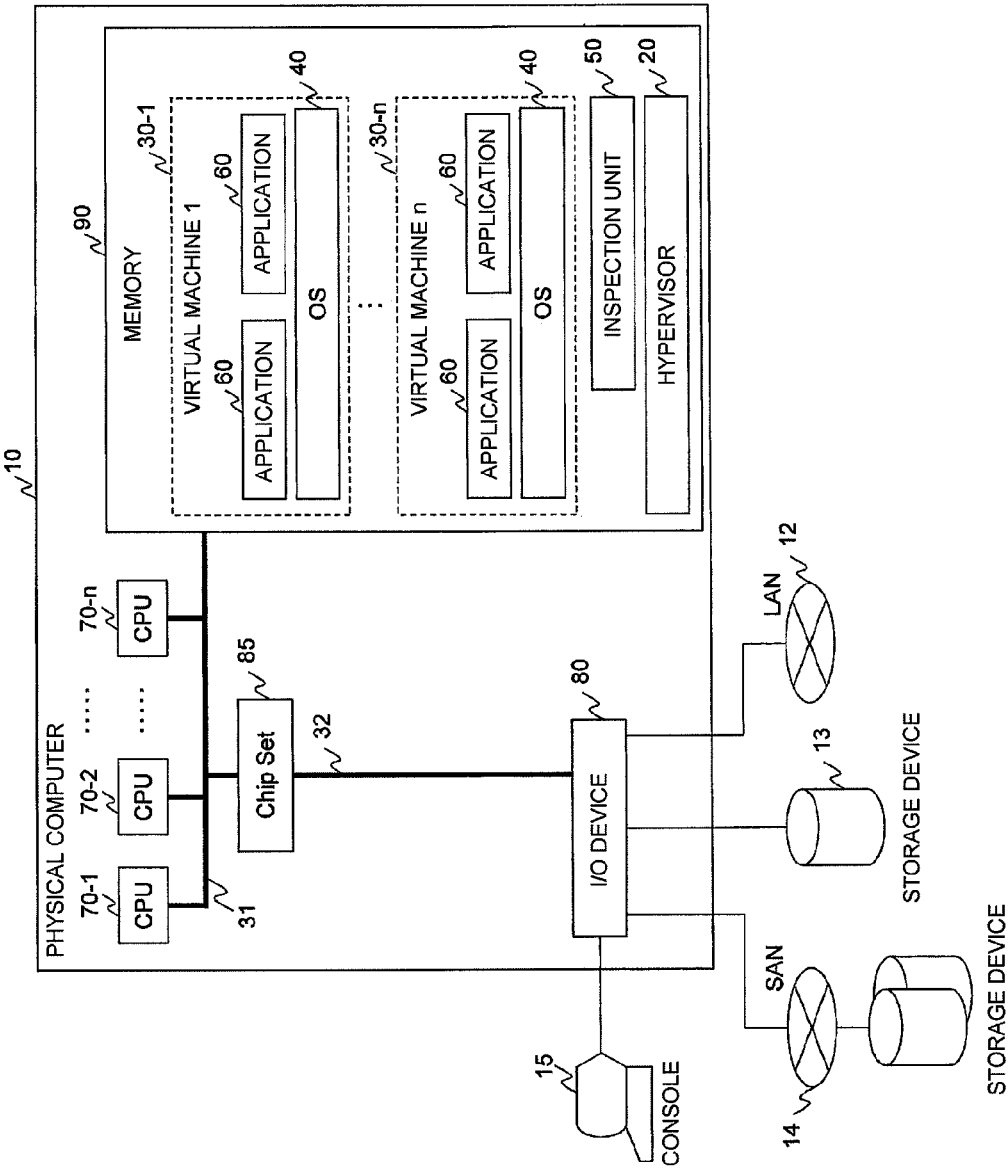
FIG. 1 is a block diagram illustrating a configuration example of a physical computer according to a first embodiment of the present invention.

FIG. 1 is a block diagram illustrating a configuration example of a physical computer according to a first embodiment of the present invention.

A physical computer 10 includes one or more CPUs 70, and those CPUs 70 are connected to a chip set 85 and a memory 90 through an interconnect 31 such as a QPI (quick path interconnect) or an SMI (scalable memory interconnect).

The chip set 85 is connected with an I/O device 80 through a bus 32 such as a PCIexpress. The I/O device 80 is configured by an NIC (network interface card) connected to a LAN 12, an HBA (host bus adapter) connected to a storage device 13 and a SAN 14 (storage area network), and a graphic controller connected to a console 15. A plurality of the I/O devices 80 may be provided.

The CPUs 70 access to the memory 90 through the interconnect 31, and also access to the I/O device 80 through the chip set 85 to execute given processing. Likewise, the I/O device 80 accesses to the memory 90 through the chip set 85.

The memory 90 stores programs to be executed by the CPUs 70, and information necessary for execution of the programs therein. As illustrated in FIG. 1, a program (for example, system software) for realizing a hypervisor 20 is loaded in the memory 90, and the program is executed by the CPUs 70. Also, a program (for example, inspection program) for realizing an inspection unit 50 is loaded in the memory 90, and the program is executed by the CPUs 70.

In the following description, when the hypervisor 20 and the inspection unit 50 are described as subjects, programs for realizing the hypervisor 20 and the inspection unit 50 are executed by the CPUs 70.

The hypervisor 20 controls the physical computer 10. The hypervisor 20 assigns apart of a storage area in the memory 90 to the inspection unit 50 and a virtual machine 30. An OS 40 and an application 60 operate on the virtual machine 30.

(Software Configuration)

Subsequently, a main portion of a configuration of software executed on the physical computer 10, and a hardware element to be controlled will be described in detail with reference to FIG. 2.

Figure 2:
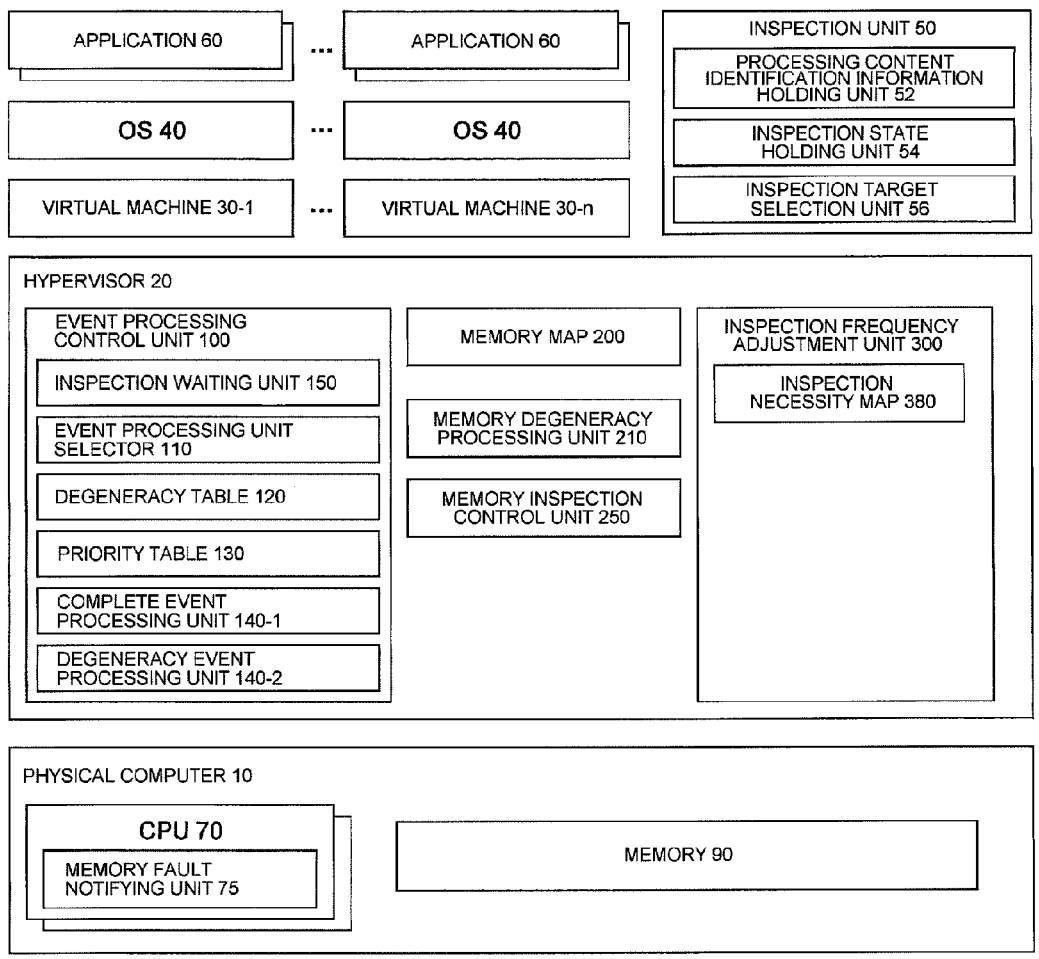
FIG. 2 is a stack diagram illustrating a configuration of software and hardware in a computer system according to the first embodiment of the present invention.

FIG. 2 is a stack diagram illustrating a configuration of software and hardware in a computer system according to the first embodiment of the present invention.

The virtual machine 30 is created on the physical computer 10, and the hypervisor 20 for management operates as a system control unit. The OS 40 operates on the virtual machine 30. Further, the OS 40 executes the application 60.

The physical computer 10 includes the CPUs 70 and the memory 90. Each of the CPUs 70 according to this embodiment includes a memory fault notifying unit 75.

If the memory fault notifying unit 75 detects an uncorrectable memory fault when reading data from the memory 90, the memory fault notifying unit 75 notifies a system control unit (hypervisor 20) of an address of the read data on the memory 90 as well as a fact that the uncorrectable memory fault occurs. Also, in the case of a correctable memory fault, the same information may be notified to the system control unit (hypervisor 20).

Hereinafter, for simplification of description, the uncorrectable memory fault is described as a memory fault, and the address on the memory at which the uncorrectable memory fault occurs is described as a fault address.

As a method of notifying the above-mentioned information, several methods are proposed. For example, there is proposed a method in which the fault address and a bit pattern representing an uncorrectable memory fault are stored in a register provided in the memory fault notifying unit 75, and interrupt is created.

A state register that holds a program execution state such as a command address is included in the CPUs 70. When the memory fault is detected, a part of values of the state register may be garbled into an uncorrectable value.

The hypervisor 20 controls the inspection unit 50 that inspects the memory 90, also creates the virtual machine 30, and manages the created virtual machine 30. The hypervisor 20 includes an event processing control unit 100, a memory map 200, a memory degeneracy processing unit 210, an inspection frequency adjustment unit 300, and a memory inspection control unit 250.

The event processing control unit 100 processes an event occurring in the virtual machine 30 and the physical computer 10 when operating the OS 40 and the application 60 on the virtual machine 30.

The event processing control unit 100 includes a plurality of event processing units 140, an event processing unit selector 110, an inspection waiting unit 150, a degeneracy table 120, and a priority table 130.

The event processing units 140 processes the created event. The respective event processing units 140 are different in the storage area of the memory 90 to be used. In this embodiment, the event processing units 140 includes, as an example, a complete event processing unit 140-1 that processes all of creatable events, and a degeneracy event processing unit 140-2 that omits a part of processing.

The degeneracy event processing unit 140-2 returns a fact that the degeneracy event processing unit 140-2 does not support a function of realizing a live migration in response to a live migration request of the virtual machine 30, and has such a limit that the amount of log messages output when a software fault occurs is small.

The event processing unit selector 110 selects any one of the event processing units 140 to be applied to the created event, on the basis of the priority table 130 and the degeneracy table 120. The inspection waiting unit 150 delays a start of processing until the memory inspection is completed.

The priority table 130 stores application priorities indicative of a priority order in which a plurality of event processing units 140 is applied, for each type of the events. The detail of the priority table 130 will be described later with reference to FIG. 6. The degeneracy table 120 stores inspection results of the memory 90 therein, and is used when processing the respective events created by the respective event processing units 140. The details of the degeneracy table 120 will be described later with reference to FIG. 7.

The software configuration of the event processing control unit 100 is described above.

The memory map 200 stores information used for inspecting the memory 90 while avoiding the degradation of security and performance, which pertains to processing using the storage area of the memory 90 corresponding to an appropriate memory address for each memory address therein. The details of the memory map 200 will be described in detail with reference to FIG. 4.

The memory degeneracy processing unit 210 is called with the memory fault, forcedly terminates the inspection unit 50, and suppresses read of the subsequent fault addresses.

The memory inspection control unit 250 controls the inspection unit 50 on the basis of the determination results of the inspection frequency adjustment unit 300.

The inspection frequency adjustment unit 300 determines whether the memory inspection is necessary, or not, according to the type of the created event. The inspection frequency adjustment unit 300 includes an inspection necessity map 380 that holds information indicative of whether the memory inspection defined in advance is necessary, or not, according to the type of event.

Information indicating that the memory inspection is necessary for the important event whose log needs to be surely preserved, for example, such as the creation of a software fault, is defined in the inspection necessity map 380. Also, for the memory fault is liable to occur in the events low in occurrence frequency such as the live migration request of the virtual machine 30, information that the memory inspection is necessary is defined. The details of the inspection necessity map 380 will be described later with reference to FIG. 5.

The inspection unit 50 executes the memory inspection. The inspection unit 50 includes a processing content identification information holding unit 52, an inspection state holding unit 54, and an inspection target selection unit 56.

The processing content identification information holding unit 52 holds information related to processing intended to be executed by the hypervisor 20, that is, processing content identification information. A data format of the processing content identification information held by the processing content identification information holding unit 52 is identical with the memory map 200 which will be described later.

The inspection state holding unit 54 manages the inspection state of the memory inspection. More specifically, the inspection state holding unit 54 holds any one of "starting" (during inspection start), "running" (during inspection), "stop" (normal inspection completion), and "error" (abnormal inspection completion).

The inspection target selection unit 56 specifies the storage area of the memory 90 to be memory-inspected on the basis of the memory map 200 and the processing content identification information holding unit 52.

Figure 3:
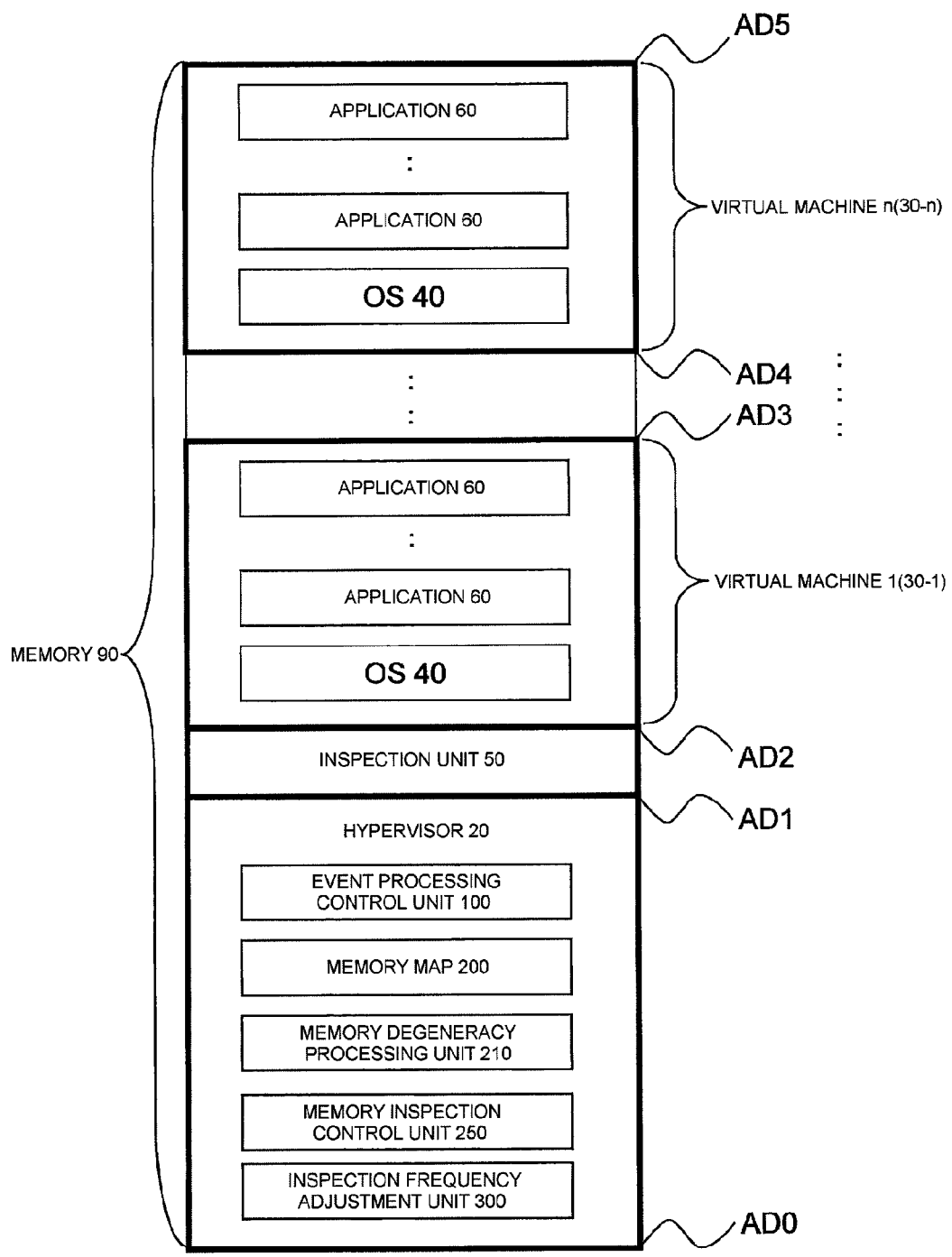
FIG. 3 is a diagram illustrating an example of a memory managed by a hypervisor according to the first embodiment of the present invention.

FIG. 3 is a diagram illustrating an example of the memory 90 managed by the hypervisor 20 according to the first embodiment of the present invention.

The hypervisor 20 manages the assignment of the storage area of the memory 90, and assigns an area in which the hypervisor 20 per se is arranged, an area which is used by the virtual machine 30, and an area which is used by the inspection unit 50 on the memory 90.

For example, as illustrated in FIG. 3, the hypervisor 20 assigns the storage area in an address range from AD0 to AD1 to the hypervisor 20 per se, and the storage area in an address range from AD1 to AD2 to the inspection unit 50. Also, the hypervisor 20 assigns the storage area in an address range from AD2 to AD3 to the virtual machine 30-1, and the storage area in an address range from AD4 to AD5 to the virtual machine 30-n. The storage areas assigned to the hypervisor 20 and the inspection unit 50 are fixed, but the storage area assigned to the virtual machine 30 can be dynamically changed.

The event processing control unit 100, the memory map 200, the memory degeneracy processing unit 210, the memory inspection control unit 250, and the inspection frequency adjustment unit 300 are stored in the area in which the hypervisor 20 is arranged.

The OS 40 is stored in the area in which the virtual machine 30 is arranged. The OS 40 assigns an area in which the OS 40 per see is arranged, and an area which is used by the application 60, in the above area.

Also, the processing content identification information holding unit 52, the inspection state holding unit 54, and the inspection target selection unit 56 are stored in the area in which the inspection unit 50 is arranged.

FIG. 4 is an illustrative view illustrating an example of the memory map 200 according to the first embodiment of the present invention.

The memory map 200 includes an initial memory address 410, a size 420, and processing content identification information 430.

The initial memory address 410 stores an initial address in the storage area of a given memory 90 therein. The size 420 stores a size of the storage area in the given memory 90. The hypervisor 20 can grasp a position and the size of the storage area in the given memory 90 on the basis of the initial memory address 410 and the size 420.

As illustrated in FIG. 4, the event processing units 140 using the storage area and the information on the event to be executed are associated as the processing content identification information 430 in the storage area of the given memory 90.

The processing content identification information 430 stores the created event and the information for specifying the event processing units 140 that processes the event therein. More specifically, the processing content identification information 430 includes an event identifier 440 and an event processing unit identifier 450.

The event identifier 440 stores an identifier for uniquely identifying the created event therein. The event processing unit identifier 450 stores an identifier for uniquely identifying the event processing units 140 that processes the event corresponding to the event identifier 440 therein.

The data format of the processing content identification information 430 is identical with that used in the processing content identification information holding unit 52.

FIG. 5 is an illustrative view illustrating an example of the inspection necessity map 380 according to the first embodiment of the present invention.

The inspection necessity map 380 includes the event identifier 440 and inspection necessity 465. As illustrated in FIG. 5, information indicative of whether the memory inspection is necessary, or not, for each of the events is stored.

The inspection necessity 465 stores information indicative of whether the memory inspection is necessary, or not, when the event corresponding to the event identifier 440 is executed by the hypervisor 20. In this embodiment, anyone of "necessary" indicating that the memory inspection is necessary, or "unnecessary" indicating that the memory inspection is unnecessary is stored in the inspection necessity 465. The inspection necessity 465 is not limited to the expression of binary values of "necessary" and "unnecessary".

In this embodiment, the inspection necessity map 380 is set in advance. For example, in the case of the important event whose log needs to be surely preserved, for example, such as the creation of a software fault, "necessary" is stored in the inspection necessity 465 of the entry corresponding to the event. Also, in the event low in the occurrence frequency such as the live migration request of the virtual machine, the memory fault is liable to occur in the storage area of the memory 90 used by the event processing units 140. Therefore, "necessary" is stored in the inspection necessity 465 of the entry corresponding to the event. On the other hand, "unnecessary" is stored in the inspection necessity 465 of the entry corresponding to the event low in the occurrence frequency and low in importance such as data reception from the LAN 12.

FIG. 6 is an illustrative view illustrating an example of the priority table 130 according to the first embodiment of the present invention.

The priority table 130 includes the event identifier 440, the event processing unit identifier 450, and a priority 470. As illustrated in FIG. 6, information pairing the event processing units 140 that processes the event with the priority order of the applied event processing units 140 is stored for each of the events.

The priority 470 stores, when an event corresponding to the event identifier 440 occurs, an application order of the event processing units 140 that preferentially processes the above event.

The hypervisor 20 according to this embodiment includes two of the complete event processing unit 140-1 and the degeneracy event processing unit 140-2 as the event processing units 140. Accordingly, any one identifier of the complete event processing unit 140-1 and the degeneracy event processing unit 140-2 is stored in the event processing unit identifier 450 for one event identifier 440. Any value of "1" and "2" is stored in the priority 470. In this embodiment, a value of the priority 470 is applied in order from smaller event processing units 140.

In this embodiment, the priority 470 of the complete event processing unit 140-1 is set to "1". However, the present invention is not limited to this configuration, but a value of the priority 470 different in each event may be set.

The hypervisor 20 may include three or more event processing units 140.

FIG. 7 is an illustrative view illustrating an example of the degeneracy table 120 according to the first embodiment of the present invention.

The degeneracy table 120 includes the event identifier 440, the event processing unit identifier 450, and an inspection result 480. As illustrated in FIG. 7, the inspection result of the memory inspection is stored in each storage area of the memory 90 which is uniquely specified by the combination of a created event with the event processing units 140 that processes the event.

The inspection result 480 stores the inspection result of the memory inspection for the storage area of the memory 90 used by the event processing units 140 that processes a given event therein. In this embodiment, any one of "normal" indicating that the inspection result of the memory inspection is normal, and "abnormal" indicating that the inspection result of the memory inspection is abnormal is stored therein. "normal" is stored in the inspection result 480 as an initial value.

In this embodiment, as will be described later, the use of the storage area of the memory 90 in which the inspection result 480 is "abnormal" is avoided by the event processing unit selector 110. That is, control is so conducted as not to select the event processing unit 140 using the storage area of the memory 90 in which the abnormality occurs.

(Processing Executed by Hypervisor)

Subsequently, a description will be given of an example of the processing executed by the hypervisor 20 with reference to a flowchart.

Figure 8:
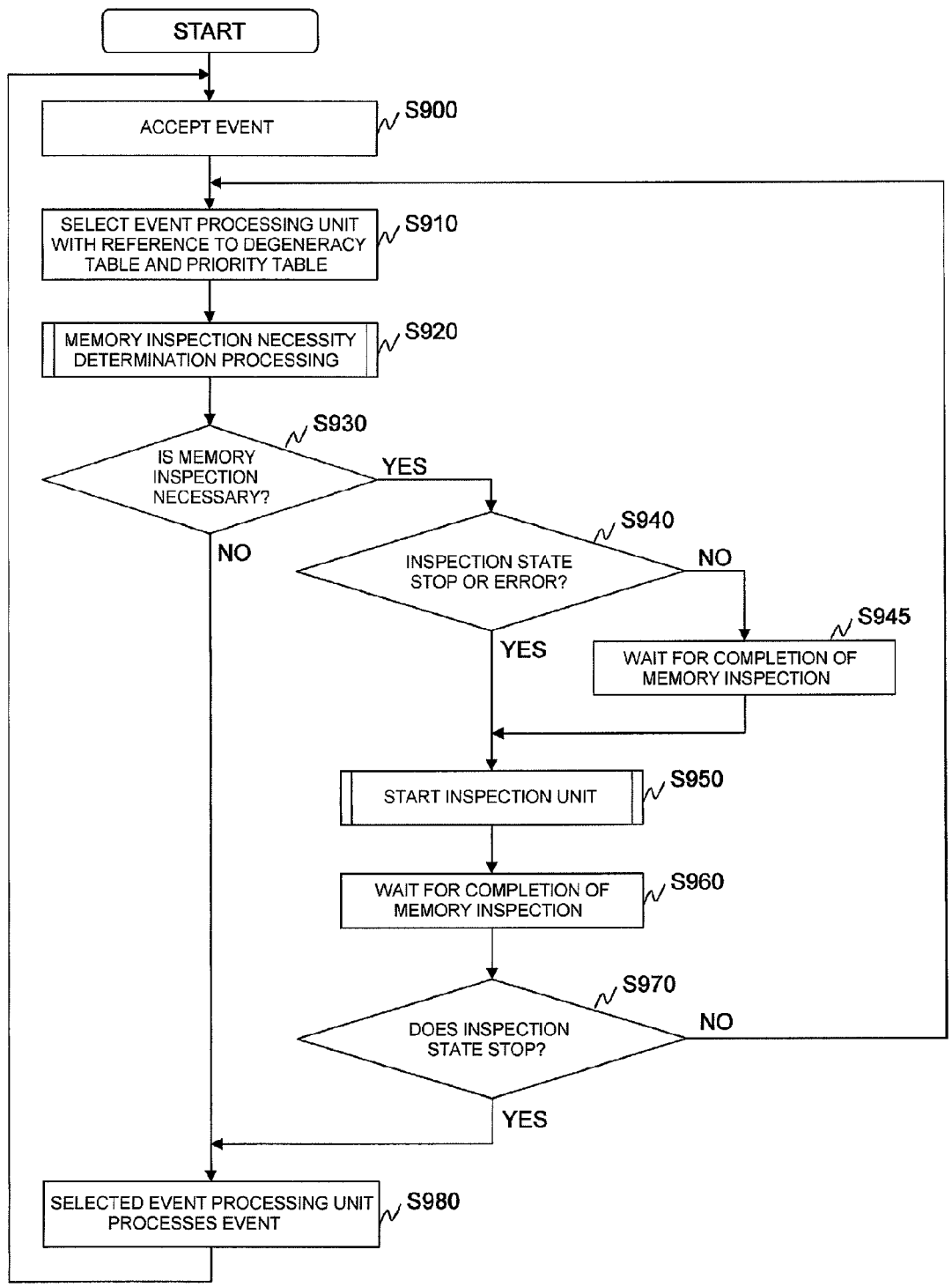
FIG. 8 is a flowchart illustrating an example of an event processing loop executed by the hypervisor according to the first embodiment of the present invention.

FIG. 8 is a flowchart illustrating an example of an event processing loop executed by the hypervisor 20 according to the first embodiment of the present invention. The event processing is loop processing that is repetitively executed until the processing of the hypervisor 20 per se stops.

Upon accepting the event created in the physical computer 10 or the virtual machine 30 (Step S900), the hypervisor 20 selects any one of the event processing units 140 which processes the created event with reference to the degeneracy table 120 and the priority table 130 (Step S910). More specifically, the following processing is executed.

The 110 specifies the event identifier of the created event. The event processing unit selector 110 retrieves an entry that matches the event identifier specified by the event identifier 440 with reference to the degeneracy table 120. Further, the event processing unit selector 110 specifies the entry in which the "normal" is stored in the inspection result 480, with reference to the inspection result 480 of the retrieved entry.

Then, the event processing unit selector 110 retrieves the entry that matches the event identifier 440 and the event processing unit identifier 450 of the entry specified from the degeneracy table 120 with reference to the priority table 130. The event processing unit selector 110 selects an entry highest in the application order from the retrieved entries with reference to the priority 470 of the retrieved entry.

With the above processing, the event processing unit 140 corresponding to the event processing unit identifier 450 of the selected entry is selected. In this situation, the event processing units 140 using the storage area of the memory 90 including the entry in which the inspection result 480 is "abnormal", that is, the fault address, are not selected.

The processing in Step S910 is described above.

Then, the hypervisor 20 instructs the inspection frequency adjustment unit 300 to execute the necessity determination processing of the memory inspection (Step S920). The details of the processing to be executed by the inspection frequency adjustment unit 300 will be described later with reference to FIG. 9.

The hypervisor 20 determines whether the memory inspection is necessary, or not, on the basis of the determination result from the inspection frequency adjustment unit 300 (Step S930). That is, it is determined whether the inspection program that realizes the inspection unit 50 needs to be executed, or not.

More specifically, the hypervisor 20 determines whether the determination result that the memory inspection is necessary is output from the inspection frequency adjustment unit 300, or not. If the determination result that the memory inspection is necessary is output from the inspection frequency adjustment unit 300, the hypervisor 20 determines that the memory inspection is necessary. On the other hand, if the determination result that the memory inspection is unnecessary is output from the inspection frequency adjustment unit 300, the hypervisor 20 determines that the memory inspection is unnecessary.

If it is determined that the memory inspection is unnecessary, the hypervisor 20 instructs the selected event processing unit 140 on the processing of the created event (Step S980). Thereafter, the hypervisor 20 returns to Step S900, and executes the same processing.

If it is determined that the memory inspection is necessary, the hypervisor 20 determines whether the inspection state of the memory inspection corresponds to "stop" or "error" (Step S940).

More specifically, the hypervisor 20 determines whether the inspection state corresponds to "stop" or "error", with reference to the inspection state holding unit 54. This is processing for determining whether the inspection unit 50 has already executed the memory inspection, or not.

If it is determined that the inspection state is not "stop" or "error", that is, the inspection state is "starting" or "running", the hypervisor 20 continues to wait for the completion of the memory inspection (Step S945).

More specifically, the inspection waiting unit 150 continues to wait until the memory inspection is completed, and the inspection state becomes "stop" or "error", cyclically with reference to the inspection state holding unit 54. Thereafter, the hypervisor 20 transits to Step S950.

If it is determined that the inspection state is "stop" or "error", the hypervisor 20 starts the inspection unit 50 (Step S950).

More specifically, the memory inspection control unit 250 executes initialization processing of the inspection unit 50. The details of the initialization processing of the inspection unit 50 will be described later with reference to FIG. 10.

After the inspection unit 50 starts, the hypervisor 20 continues to wait for the completion of the memory inspection (Step S960).

More specifically, the inspection waiting unit 150 continues to wait until the memory inspection is completed, and the inspection state becomes "stop" or "error", cyclically with reference to the inspection state holding unit 54.

After the memory inspection has been completed, and the inspection state has been changed, the hypervisor 20 determines whether the inspection state is "stop", or not (Step S970). That is, it is determined whether the memory inspection is normally completed, or not.

If it is determined that the inspection state is "stop", the hypervisor 20 instructs the selected event processing unit 140 on the processing of the created event (Step S980).

If it is determined that the inspection state is not "stop", that is, the inspection state is "error", the hypervisor 20 returns to Step S910, and executes the same processing. In order to avoid the reference of the fault address, in Step S910, the event processing unit 140 different from the event processing unit 140 selected previously is selected.

Figure 9:
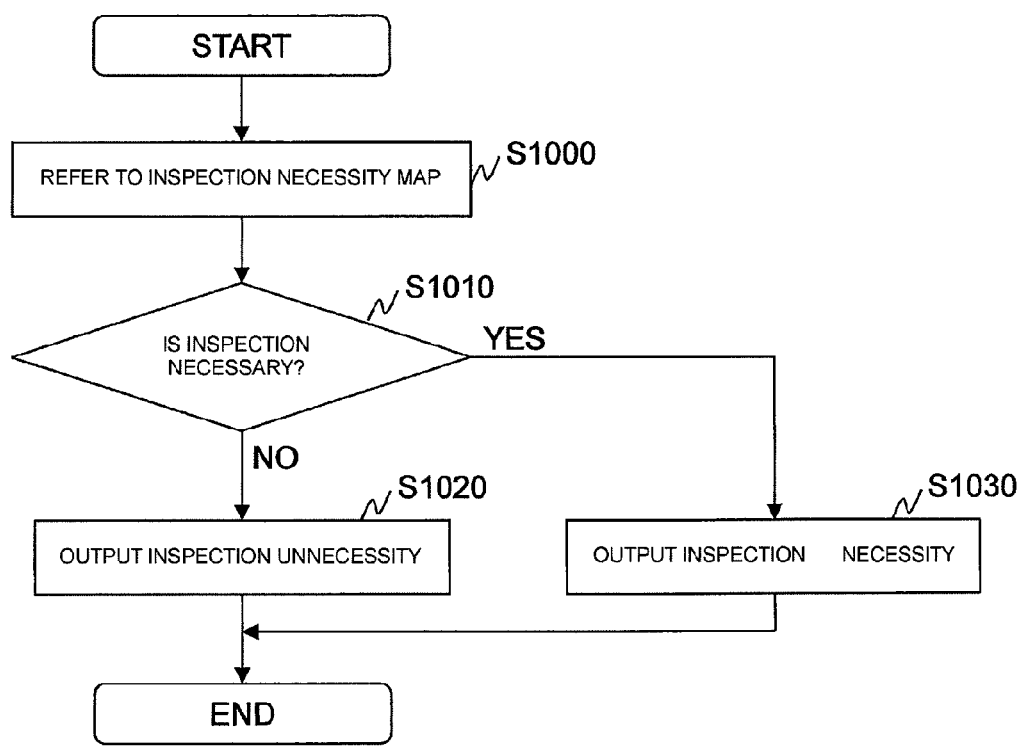
FIG. 9 is a flowchart illustrating an example of processing executed by an inspection frequency adjustment unit according to the first embodiment of the present invention.

FIG. 9 is a flowchart illustrating an example of processing executed by the inspection frequency adjustment unit 300 according to the first embodiment of the present invention.

The inspection frequency adjustment unit 300 retrieves the entry corresponding to the created event with reference to the inspection necessity map 380 (Step S1000).

More specifically, the inspection frequency adjustment unit 300 retrieves, with the identifier of a created event as a key, an entry in which the event identifier 440 matches the identifier of that event, with reference to the inspection necessity map 380.

The inspection frequency adjustment unit 300 determines whether the memory inspection is necessary for the created event, or not (Step S1010).

More specifically, the inspection frequency adjustment unit 300 determines whether the inspection necessity 465 of the retrieved entry is "necessary", or not. If the inspection necessity 465 of the retrieved entry is "necessary", it is determined that the memory inspection is necessary for the created event.

If it is determined that the memory inspection is not necessary for the created event, the inspection frequency adjustment unit 300 outputs the determination result that the memory inspection is unnecessary (Step S1020).

If it is determined that the memory inspection is necessary for the created event, the inspection frequency adjustment unit 300 outputs the determination result that the memory inspection is necessary (Step S1030).

Figure 10:
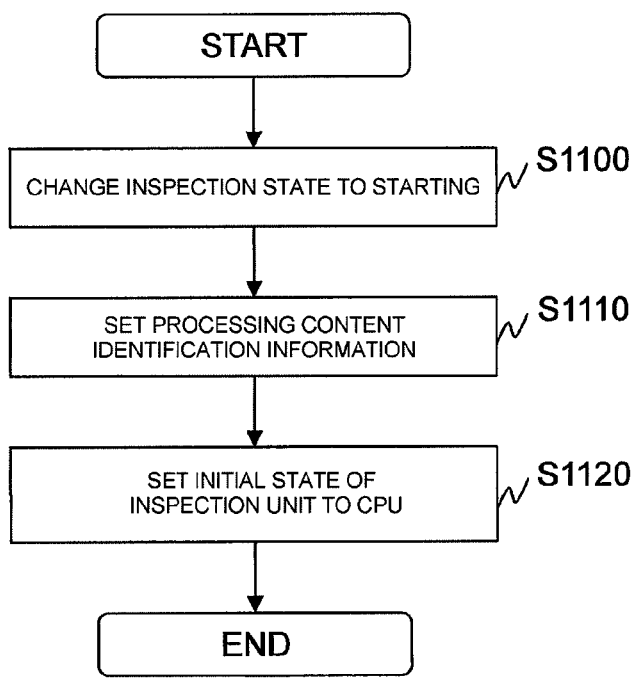
FIG. 10 is a flowchart illustrating an example of initialization processing of an inspection program according to the first embodiment of the present invention.

FIG. 10 is a flowchart illustrating an example of the initialization processing of the inspection unit 50 according to the first embodiment of the present invention.

The memory inspection control unit 250 changes the inspection state held by the inspection state holding unit 54 to "starting" (Step S1100).

At this time, the inspection unit 50 has not yet start. However, in this embodiment, because the hypervisor 20 assigns the fixed storage area of the memory 90 to the inspection state holding unit 54, the information held by the inspection state holding unit 54 can be updated even before the inspection unit 50 starts.

The memory inspection control unit 250 sets the processing content identification information for the processing content identification information holding unit 52 (Step S1110).

More specifically, the processing content identification information pairing the identifier of the created event with the identifier of the selected event processing unit 140 is set.

The memory inspection control unit 250 sequentially sets an initial state such as a command address for the CPUs 70 with respect to the inspection unit 50 (Step S1120), and thereafter starts the inspection unit 50.

Figure 11:
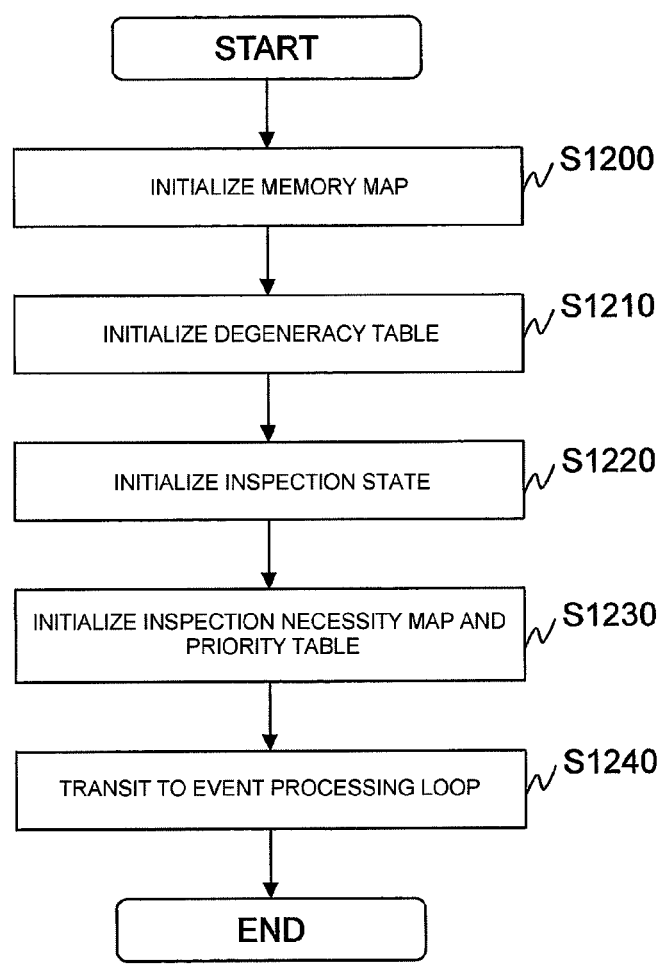
FIG. 11 is a flowchart illustrating an example of the initialization processing executed by the hypervisor according to the first embodiment of the present invention.

FIG. 11 is a flowchart illustrating an example of the initialization processing executed by the hypervisor 20 according to the first embodiment of the present invention.

The hypervisor 20 initializes the memory map 200 (Step S1200).

More specifically, the hypervisor 20 determines an address range (storage area of the memory 90) of the memory 90 to be assigned to the hypervisor 20 per se and the inspection unit 50. Then, the hypervisor 20 stores an initial address and a size of the address range of the memory 90 determined in the memory map 200 therein.

In this embodiment, the fixed storage area of the memory 90 is assigned to the inspection unit 50. Alternatively, there may be applied a method in which the hypervisor 20 assigns the storage area of the memory 90 at the time of executing the inspection unit 50, and stores the address in the storage area of the memory 90 assigned to the hypervisor 20.

The hypervisor 20 initializes the degeneracy table 120 and the inspection state holding unit 54 (Step S1210, Step S1220).

More specifically, the hypervisor 20 sets the inspection result 480 of all entries in the degeneracy table 120 to "normal", and sets the inspection state holding unit 54 to "stop".

The hypervisor 20 initializes the inspection necessity map 380 and the priority table 130 to predetermined values (Step S1230), and transits to an event processing loop illustrated in FIG. 8 (Step S1240).

(Processing Executed by Inspection Unit and Degeneracy Processing after Memory Fault Detection)

Figure 12:
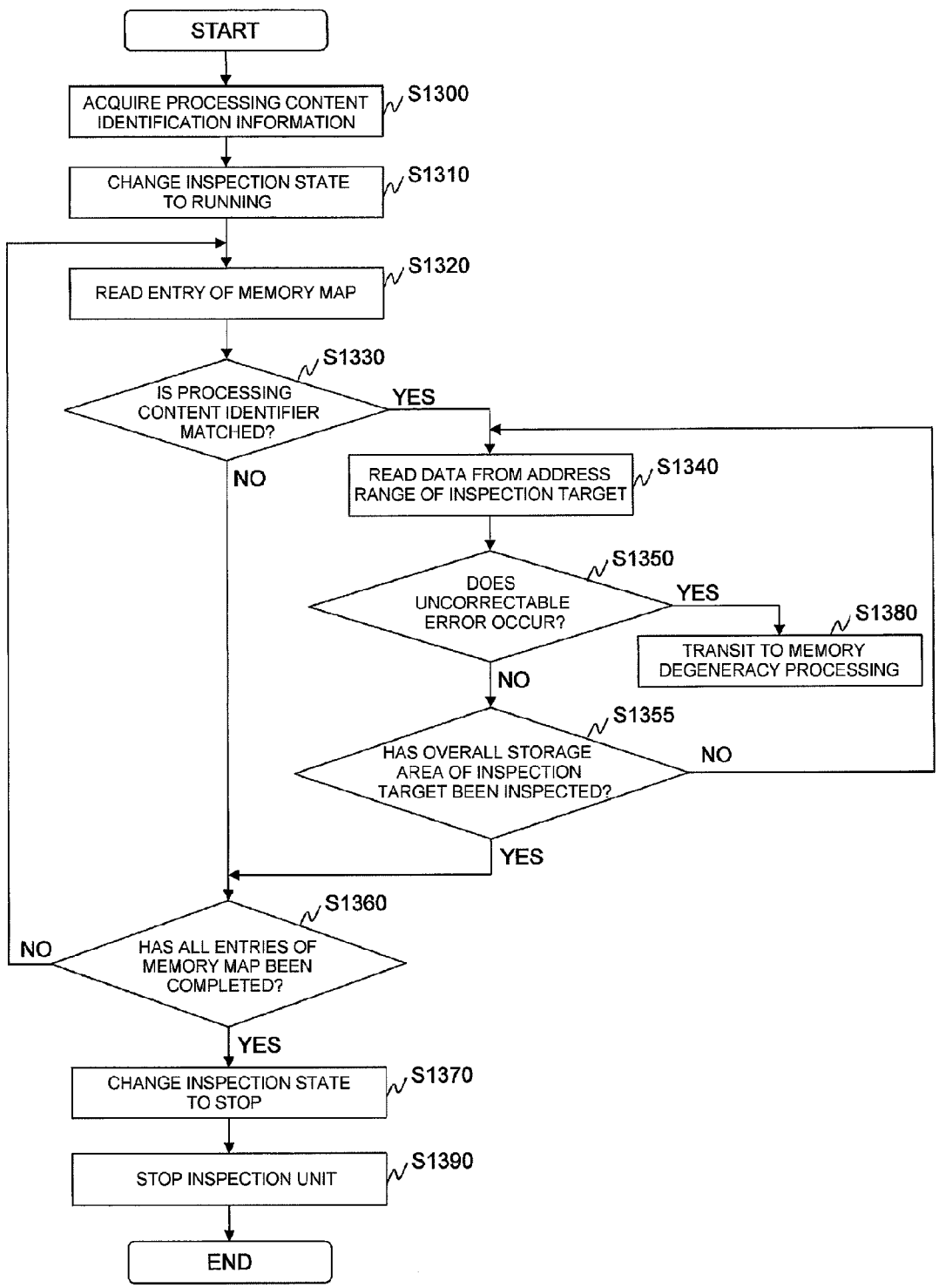
FIG. 12 is a flowchart illustrating an example of processing executed by the inspection program according to the first embodiment of the present invention.

FIG. 12 is a flowchart illustrating an example of processing executed by the inspection unit 50 according to the first embodiment of the present invention.

The inspection unit 50 acquires the identifier of the created event and the identifier of the selected event processing unit 140 as the processing content identification information with reference to the processing content identification information holding unit 52 (Step S1300). The inspection unit 50 changes the inspection state held by the inspection state holding unit 54 to "running" (Step S1310). As a result, the hypervisor 20 can grasp that the memory inspection has started.

The inspection unit 50 reads the entry of the memory map 200 (Step S1320).

More specifically, the inspection target selection unit 56 reads the entries of the memory map 200 in the loop processing of from Step S1320 to Step S1360 in order from above one by one.

In the following description, the read entry of the memory map 200 is also called "target entry".

The inspection target selection unit 56 determines whether the processing content identification information 430 of the target entry matches the acquired processing content identification information, or not (Step S1330).

If it is determined that the processing content identification information 430 matches the processing content identification information, the inspection target selection unit 56 read data in the address range to be inspected (Step S1340). More specifically, the following processing is executed.

If the flow transits from Step S1330 to Step S1340, the inspection target selection unit 56 first deals the storage area of the memory 90 designated by the initial memory address 410 and the size 420 of the target entry as the storage area to be inspected. When the flow transits from Step S1355 to Step S1340, processing of determining the storage area to be inspected as described above can be omitted.

Further, the inspection target selection unit 56 reads data included in a given address range from the storage area to be inspected. In this situation, data is read in order from the initial memory address 410.

The amount of data (size) and the address range which are read in the respective loop processing can be arbitrarily set according to the performance and the processing load of the physical computer 10. For example, when the physical computer 10 includes the CPUs 70 of 8 bytes which are high in read speed, and the memory 90 of a 64 byte unit giving ECC, there is a method in which the address range is set to a 64 byte interval, and the amount of data to be read is set to 8 bytes in each time.

The processing of Step S1340 is described above. Then, each of the CPUs 70 determines whether an uncorrectable error occurs in the data read from the address to be inspected, or not, in Step S1340 (Step S1350). The method of detecting the occurrence of the uncorrectable error may be conducted by a known technique, and therefore a description thereof will be omitted.

If it is determined that the uncorrectable error occurs, the memory fault notifying unit 75 of the CPU 70 calls the memory degeneracy processing unit 210, and transits to the memory degeneracy processing (Step S1380). The details of the memory degeneracy processing will be described later with reference to FIG. 13.

A method of allowing the memory fault notifying unit 75 to call the memory degeneracy processing unit 210 may be any methods. For example, there is conceivable a method of registering the memory degeneracy processing unit 210 in the CPU 70 as an interrupt handler in advance, and calling with the fault interrupt.

If it is determined that the uncorrectable error does not occur, the inspection target selection unit 56 determines whether the inspection has been completed for the overall storage area to be inspected, or not (Step S1355).

If it is determined that the inspection has not yet been completed for the overall storage area to be inspected, the inspection target selection unit 56 returns to Step S1340, reads a subsequent address range (for example, address range advanced by 64 bytes), and executes the same processing.

If it is determined that the inspection has been completed for the overall storage area to be inspected, the inspection target selection unit 56 determines whether the processing has been completed for the overall entry of the memory map 200, or not (Step S1360).

If it is determined that the processing has not yet been completed for all of the entries of the memory map 200, the inspection target selection unit 56 returns to Step S1320, reads a subsequent entry from the 200, and executes the same processing.

If it is determined that the processing has been completed for all of the entries of the memory map 200, the inspection unit 50 changes the inspection state of the inspection state holding unit 54 to "stop" (Step S1370), and stops the inspection unit 50 per se (Step S1390).

Figure 13:
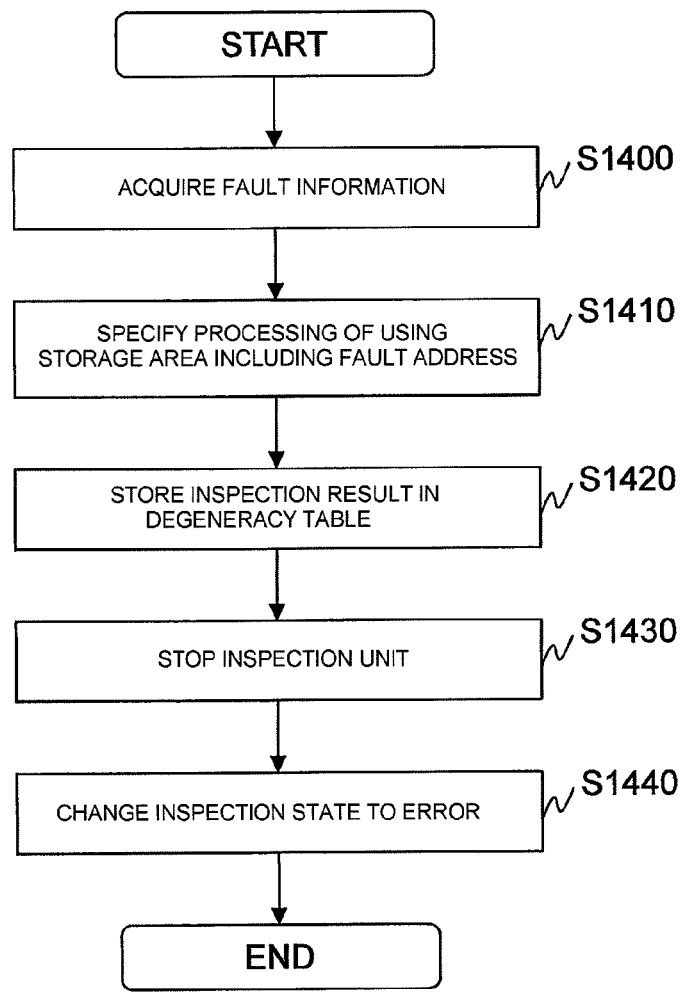
FIG. 13 is a flowchart illustrating an example of memory degeneracy processing according to the first embodiment of the present invention.

FIG. 13 is a flowchart illustrating an example of the memory degeneracy processing according to the first embodiment of the present invention.

The memory degeneracy processing unit 210 is called when it is determined that the uncorrectable error occurs (Yes in Step S1350), and starts the following processing.

The memory degeneracy processing unit 210 acquires a bit pattern that the fault address and the uncorrectable error occur (Step S1400).

For example, the memory degeneracy processing unit 210 reads the register of the memory fault notifying unit 75, thereby being capable of acquiring the fault address and the bit pattern.

The memory degeneracy processing unit 210 specifies the processing using the storage area of the memory 90 including the fault address with reference to the memory map 200 (Step S1410).

More specifically, the memory degeneracy processing unit 210 specifies the entry corresponding to the storage area of the memory 90 including the fault address on the basis of the initial memory address 410 and the size 420. Further, the memory degeneracy processing unit 210 acquires the event identifier 440 and the event processing unit identifier 450 from the specified entry.

The memory degeneracy processing unit 210 stores the inspection result of the memory inspection in the corresponding entry of the degeneracy table 120 (Step S1420).

More specifically, the memory degeneracy processing unit 210 retrieves the entry that matches the acquired event identifier 440 and event processing unit identifier 450 with reference to the degeneracy table 120. The memory degeneracy processing unit 210 changes the inspection result 480 of the retrieve entry to "abnormal".

With this processing, if the event corresponding to the event identifier 440 occurs next time, the event processing units 140 using the storage area of the memory 90 in which the uncorrectable error does not occur, in the processing of Step S910 in FIG. 8.

The memory degeneracy processing unit 210 stops the inspection unit 50 (Step S1430), and changes the inspection state of the inspection state holding unit 54 to "error" (Step S1440). With this processing, the inspection waiting unit 150 can recognize the abnormality completion of the memory inspection.

As the other embodiment, there is easily conceivable an embodiment in which, in an arbitrary program, if the uncorrectable error occurs in the memory, the memory degeneracy processing unit 210 is called, a case in which the inspection unit 50 detects the occurrence of the uncorrectable error in the memory is sorted out with the use of the No. of the CPU 70 assigned to the inspection unit 50, and the inspection state held by the inspection state holding unit 54, and then the processing of FIG. 13 is executed.

(Conclusion)

According to the first embodiment, because the inspection unit 50 is different from the hypervisor 20 that operates as the system control unit inspects the memory 90, even if the memory fault occurs, the hypervisor 20 can be prevented from going down.

Also, because the hypervisor 20 selects the event processing unit 140 that processes the created event on the basis of the degeneracy table 120, the processing of the event can be continued using only the normal storage area of the memory 90.

Also, in this embodiment, because the memory inspection target is narrowed to the processing high in the importance and the processing low in the execution frequency, the performance degradation associated with the memory inspection can be suppressed.

Also, in this embodiment, because the redundancy of the memory 90 is not necessary, the amount of memory can be prevented from decreasing.

Also, in this embodiment, in the importance processing requiring certainty that a log of the software fault is preserved, the memory inspection is executed not depending on the execution frequency. Accordingly, even in a case where a double lesion occurs in which the software fault and the memory fault continuously occur, the log that the software fault occurs can be left.

Second Embodiment

In a second embodiment, a description will be given of an example in which, in a computer system where the OS controls the physical computer as the system control unit, the memory inspection is executed on the basis of the degree of importance for each event and the occurrence frequency of the event measured at the time of the execution.

Hereinafter, the same configurations and processing as those in the first embodiment are denoted by identical symbols, and their description will be omitted.

(Hardware Configuration)

Figure 14:
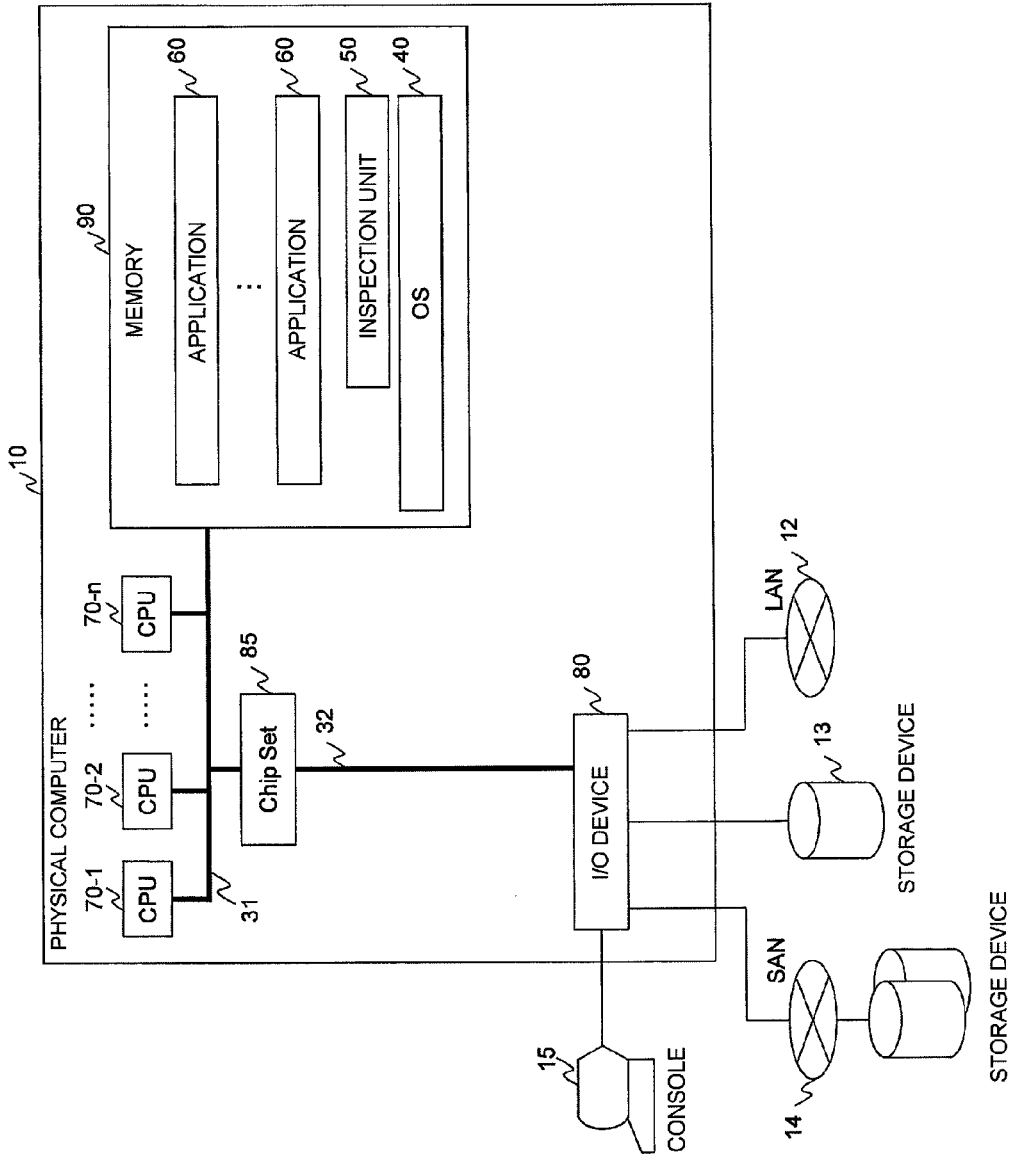
FIG. 14 is a block diagram illustrating a configuration example of a physical computer according to a second embodiment of the present invention.

FIG. 14 is a block diagram illustrating a configuration example of the physical computer according to the second embodiment of the present invention.

The hardware configuration of the physical computer 10 is identical with that of the first embodiment, and therefore their description will be omitted. In the second embodiment, the software configuration in the memory 90 is different from that in the first embodiment.

A program that realizes the OS 40 is loaded in the memory 90 of this embodiment, and the program is executed by the CPUs 70. Also, a program that realizes the inspection unit 50 is loaded in the memory 90 of this embodiment, and the program is executed by the CPUs 70.

The OS 40 controls the physical computer 10. The OS 40 assigns the storage area of the memory 90 to the inspection unit 50 and the application 60.

(Software Configuration)

Then, a description will be given in detail of a main portion of the configuration of the software executed on the physical computer 10 and the hardware element to be controlled with reference to FIG. 15.

Figure 15:
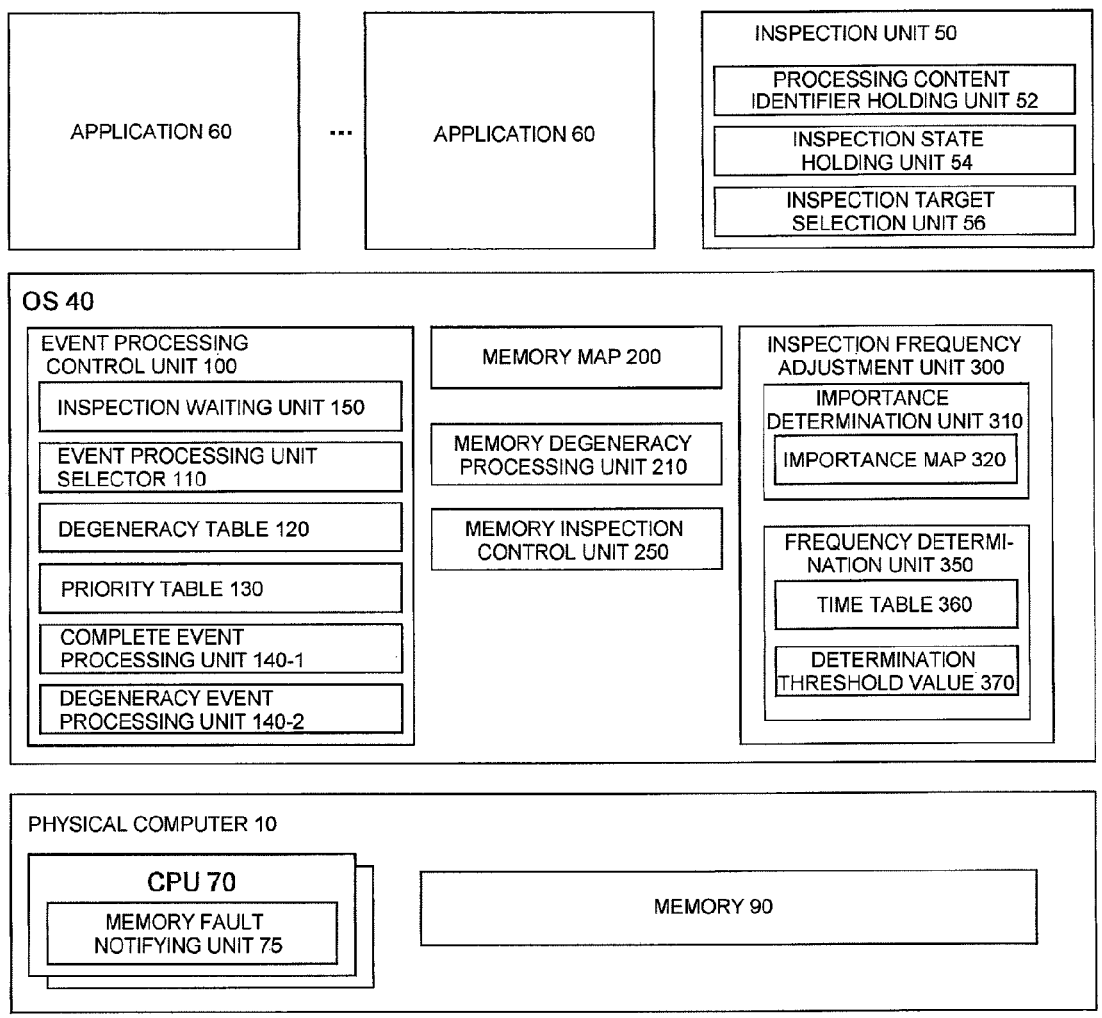
FIG. 15 is a stack diagram illustrating a software configuration and a hardware configuration in a physical computer system according to the second embodiment of the present invention.

FIG. 15 is a stack diagram illustrating the software configuration and the hardware configuration in the computer system 10 according to the second embodiment of the present invention.

The OS 40 operates as the system control unit on the physical computer 10. Also, the OS 40 further operates one or more application 60.

The OS 40 controls the inspection unit 50 that inspects the memory 90, and executes the application 60. The OS 40 includes the event processing control unit 100, the memory map 200, the memory degeneracy processing unit 210, the inspection frequency adjustment unit 300, and the memory inspection control unit 250.

The event processing control unit 100 processes an event occurring in the physical computer 10 at the time of the operation of the application 60.

The event processing control unit 100 includes a plurality of event processing units 140, the event processing unit selector 110, the inspection waiting unit 150, the degeneracy table 120, and the priority table 130.

The event processing units 140 process the created event. The event processing units 140 are different in the storage area of the memory 90 to be used, respectively. In this embodiment, the event processing units 140 includes, as an example, the complete event processing unit 140-1 that can process all of the creatable events, and the degeneracy event processing unit 140-2 that omits a part of the processing.

The degeneracy event processing unit 140-2 returns a fact that the degeneracy event processing unit 140-2 does not support a function of realizing a live migration in response to a live migration request of the virtual machine 30, and has such a limit that the amount of log messages output when a software fault occurs is small.

The configuration of the event processing control unit 100 is identical with that of the first embodiment except that the OS 40 processes the event.

The memory map 200, the memory degeneracy processing unit 210, and the memory inspection control unit 250 are identical with those in the first embodiment, and their description will be omitted.

The inspection frequency adjustment unit 300 determines whether the memory inspection is necessary, or not, according to the type of the created event. In the second embodiment, the memory inspection is executed on the storage area of the memory 90 used by the important event and the event low in the occurrence frequency.

The inspection frequency adjustment unit 300 according to the second embodiment includes an importance determination unit 310, an importance map 320, a frequency determination unit 350, a time table 360, and a determination threshold value 370.

The importance determination unit 310 determines the degree of importance of the created event. The importance map 320 stores information related to the degree of importance of the event. Information indicating that the memory inspection is necessary for the important event whose log needs to be surely preserved, for example, such as the abnormal completion of the application 60, is defined in the importance map 320. The details of the importance map 320 will be described later with reference to FIG. 18.

The frequency determination unit 350 determines the occurrence frequency of the event. The time table 360 stores a time at which the event is processed therein. The determination threshold value 370 is a threshold value for determining the level of the occurrence frequency of the event.

The inspection unit 50 executes the memory inspection. The inspection unit 50 includes the processing content identification information holding unit 52, the inspection state holding unit 54, and the inspection target selection unit 56.

The processing content identification information holding unit 52 holds information related to the processing intended to be executed by the OS 40, that is, processing content identification information. The dada format of the processing content identification information is identical with that in the first embodiment.

The inspection state holding unit 54 manages the inspection state of the memory inspection. The held inspection state is identical with that in the first embodiment.

The inspection target selection unit 56 specifies the storage area of the memory 90 to be memory-inspected on the basis of the memory map 200 and the processing content identification information holding unit 52.

FIG. 16 is a diagram illustrating an example of the memory 90 managed by the OS 40 according to the second embodiment of the present invention.

The OS 40 manages the assignment of the storage area of the memory 90, and assigns an area in which the OS 40 per se is arranged, an area which is used by the application 60, and an area which is used by the inspection unit 50 on the memory 90.

For example, as illustrated in FIG. 16, the OS 40 assigns the storage area in an address range from AD0 to AD1 to the OS 40 per se, and the storage area in an address range from AD1 to AD2 to the inspection unit 50. Also, the OS 40 assigns the storage area in an address range from AD2 to AD3, and the storage area in an address range from AD4 to AD5 to the application 60. The storage areas assigned to the OS 40 and the inspection unit 50 are fixed, but the storage area assigned to the application 60 can be dynamically changed.

The event processing control unit 100, the memory map 200, the memory degeneracy processing unit 210, the memory inspection control unit 250, and the inspection frequency adjustment unit 300 are stored in the area in which the OS 40 is arranged.

Also, the processing content identification information holding unit 52, the inspection state holding unit 54, and the inspection target selection unit 56 are stored in the area in which the inspection unit 50 is arranged.

FIG. 17 is an illustrative view illustrating an example of the memory map 200 according to the second embodiment of the present invention.

The data format of the memory map 200 is identical with that in the first embodiment, but different in that the identification information of the event executed by the OS 40 is stored in the event identifier 440.

FIG. 18 is an illustrative view illustrating an example of the importance map 320 according to the second embodiment of the present invention.

The importance map 320 includes the event identifier 440 and the degree of importance 460. As illustrated in FIG. 18, the degree of importance of the event is stored for each of the events.

The degree of importance 460 stores information indicative of whether the important event to be surely processed is present, or not, when the event corresponding to the event identifier 440 is executed by the OS 40. In this embodiment, any one of "high" indicating that the degree of importance is high, or "low" indicating that the degree of importance is low is stored in the degree of importance 460. The degree of importance 460 is not limited to the expression of binary values of "high" and "low".

In this embodiment, the importance map 320 is set in advance. For example, in the case of the degree of importance 460 of the event whose log needs to be surely preserved, for example, such as the abnormal completion of the application 60, "high" is stored.

FIG. 19 is an illustrative view illustrating an example of the time table 360 according to the second embodiment of the present invention.

The time table 360 includes the event identifier 440, and a previous time 490. As illustrated in FIG. 19, the time at which the event is previously processed is held for each of the events.

The previous time 490 stores the time at which the event corresponding to the event identifier 440 is finally processed therein.

The time table 360 is used when calculating the occurrence frequency of the event. In this embodiment, in the event high in the degree of importance, the memory inspection is executed regardless of the occurrence frequency of the event. For that reason, no time is stored at the previous time 490 of the event in which the degree of importance 460 is set to "high" in the importance map 320.

FIG. 20 is an illustrative view illustrating an example of the priority table 130 according to the second embodiment of the present invention.

The data format of the priority table 130 is identical with that in the first embodiment illustrated in FIG. 6, but different in that the identification information of the event to be executed by the OS 40 is stored in the event identifier 440.

FIG. 21 is an illustrative view illustrating an example of the degeneracy table 120 according to the second embodiment of the present invention.

The data format of the degeneracy table 120 is identical with that of the first embodiment in FIG. 7, but different in that the identification information of the event to be executed by the OS 40 is stored in the event identifier 440.

(Processing Executed by OS)

Subsequently, a description will be given of an example of the processing executed by the OS 40 with reference to a flowchart.

The event processing loop executed by the OS 40 is the same content processing as that of the first embodiment in FIG. 8 except that the processing subject is the OS 40, and therefore their description will be omitted. Also, the initialization processing of the inspection unit 50 is the same content processing as that of the first embodiment in FIG. 10 except that the OS 40 assigns the memory 90, and therefore its description will be omitted.

Figure 22:
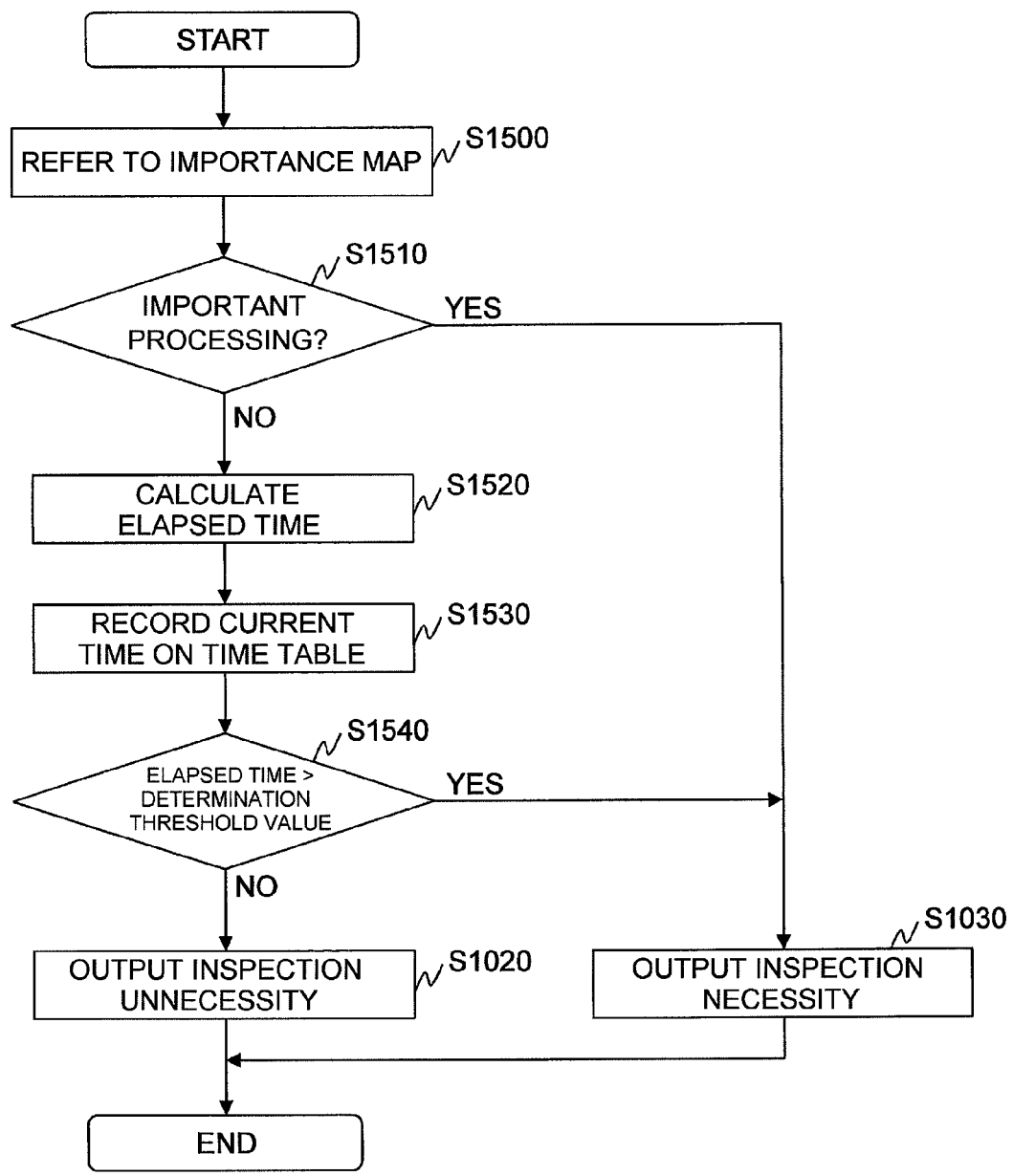
FIG. 22 is a flowchart illustrating an example of processing executed by an inspection frequency adjustment unit according to the second embodiment of the present invention.

FIG. 22 is a flowchart illustrating an example of the processing executed by the inspection frequency adjustment unit 300 according to the second embodiment of the present invention.

The inspection frequency adjustment unit 300 retrieves an entry corresponding to the created event with reference to the importance map 320 (Step S1500).

More specifically, the importance determination unit 310 retrieves an entry in which the event identifier 440 matches the identifier of the event, with reference to the importance map 320 with the identifier of the created event as a key.

The inspection frequency adjustment unit 300 determines whether the degree of importance of the created event is high, or not (Step S1510).

More specifically, the importance determination unit 310 determines whether "high" is stored in the degree of importance 460, or not, with reference to the degree of importance 460 of the retrieved entry. If "high" is stored in the degree of importance 460, it is determined that the degree of importance of the created event is high.

If it is determined that the degree of importance of the created event is high, the inspection frequency adjustment unit 300 outputs the determination result that the memory inspection is necessary (Step S1030).

If it is determined that the degree of importance of the created event is low, the inspection frequency adjustment unit 300 calculates an elapsed time since the previous same event occurs (Step S1520). More specifically, the following processing is executed.

The frequency determination unit 350 retrieves an entry in which the event identifier 440 matches the identifier of the created entry, with reference to the time table 360. The frequency determination unit 350 acquires the previous time 490 of the retrieved entry.

The frequency determination unit 350 calculates the elapsed time on the basis of the current time and the acquired previous time 490.

The processing of Step S1520 is described above.

Then, the inspection frequency adjustment unit 300 stores the current time in the previous time 490 of the corresponding entry in the time table 360 (Step S1530).

The inspection frequency adjustment unit 300 compares with the determination threshold value 370 with the calculated elapsed time, and determines whether the calculated elapsed time is larger than the determination threshold value 370, or not (Step S1540).

If it is determined that the calculated elapsed time is larger than the determination threshold value 370, the inspection frequency adjustment unit 300 outputs the determination result that the memory inspection is necessary (Step S1030). This is because the created event is a low-frequent event.

If it is determined that the calculated elapsed time is equal to or smaller than the determination threshold value 370, the inspection frequency adjustment unit 300 outputs the determination result that the memory inspection is unnecessary (Step S1020).

Figure 23:
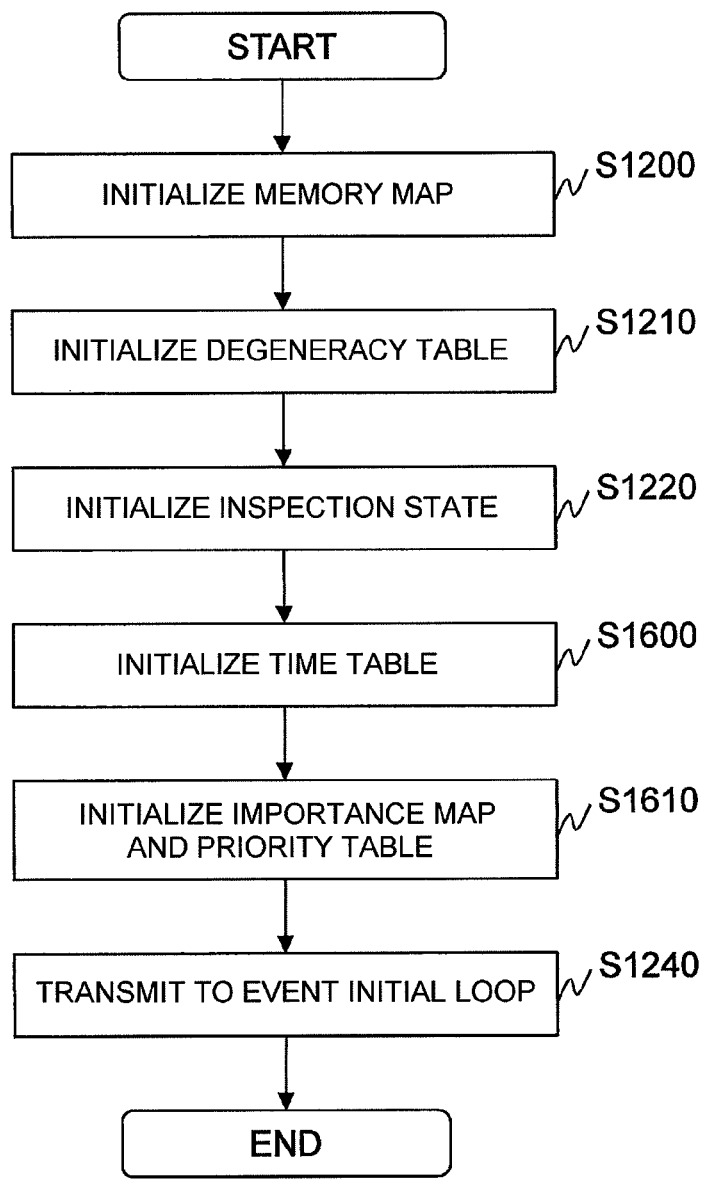
FIG. 23 is a flowchart illustrating an example of the initialization processing of the OS according to the second embodiment of the present invention.

FIG. 23 is a flowchart illustrating an example of the initialization processing of the OS 40 according to the second embodiment of the present invention.

The OS 40 initializes the memory map 200 (Step S1200).

More specifically, the OS 40 determines an address range (storage area of the memory 90) of the memory 90 to be assigned to the OS 40 per se and the inspection unit 50. Then, the OS 40 stores an initial address and a size of the address range of the memory 90 determined in the memory map 200 therein.

The OS 40 initializes the degeneracy table 120 and the inspection state holding unit 54 (Step S1210, Step S1220).

More specifically, the OS 40 sets the inspection result 480 of all entries in the degeneracy table 120 to "normal", and sets the inspection state holding unit 54 to "stop".

The OS 40 initializes the time table 360 (Step S1600).

More specifically, the OS 40 sets a value obtained by subtracting the determination threshold value 370 from the current time for the previous time 490 of the respective entries.

The OS 40 initializes the importance map 320 and the priority table 130 into predetermined values (Step S1610), and transits to an event processing loop illustrated in FIG. 8 (Step S1240).

(Processing Executed by Inspection Unit and Degeneracy Processing after Memory Fault Detection)

The processing executed by the inspection unit 50 is identical with that of the first embodiment in FIG. 12, and the memory degeneracy processing is identical with that of the first embodiment in FIG. 13. Therefore, their description will be omitted.

(Conclusion)

According to the second embodiment, because the inspection unit 50 is different from the OS 40 that operates as the system control unit inspects the memory 90, even if the memory fault occurs, the OS 40 can be prevented from going down.

Also, because the OS 40 selects the event processing unit 140 that processes the created event with the use of the degeneracy table 120, the processing of the created event can be continued with the use of only the normal storage area of the memory 90.

Also, in this embodiment, because the memory inspection target is narrowed to the processing high in the importance and the processing low in the execution frequency, the performance degradation associated with the memory inspection can be suppressed.

Also, in this embodiment, in the importance processing requiring certainty that a log related to the abnormal completion of the application 60 is preserved, the memory inspection is executed not depending on the frequency. Accordingly, even in a case where a double lesion occurs in which the software fault and the memory fault of the application continuously occur, the log can be left.

As far as there is no conflict in the processing, the processing according to the first embodiment may be applied to the second embodiment, or the processing according to the second embodiment may be applied to the first embodiment. For example, the hypervisor 20 may include the importance determination unit 310 and the frequency determination unit 350.

The variety of software exemplified in this embodiment can be stored in a variety of recording media (for example, non-transitory storage medium) such as an electromagnetic type, an electronic type, or an optical type, and can be downloaded into computers through a communication network such as the Internet.

Further, in this embodiment, control is conducted by using the software, however, a part of the software may be realized by hardware.

The present invention has been described above in detail with reference to the drawings. The present invention is not limited to those specific configurations, but includes various modifications and equivalent configurations without departing from the scope of the attached claims.

What is claimed is:

1. A computer, comprising:
   a processor;
   a memory connected to the processor; and
   an I/O device connected to the processor,
   wherein the memory stores a system software that realizes a system control unit for controlling the overall computer, and an inspection program that realizes an inspection unit for inspecting whether a memory fault is present in the memory, or not,
   wherein the processor has a memory fault notifying unit that notifies the system control unit of a fault address which is an address of the memory at which the memory fault occurs when detecting the memory fault,
   wherein the system control unit includes:
      an adjustment unit that determines whether the inspection program needs to be executed, or not, on the basis of the type of an event occurring during the operation of the system control unit;
      a plurality of event processing units that process the event with the use of different storage areas of the memory;
      inspection result information for holding results of the memory inspection executed by the inspection unit on the storage areas of the memory used by the respective plurality of event processing units;
      a fault recording unit that specifies any one of the event processing units using a storage area of the memory including the fault address, and records the memory fault in the specified event processing unit in the inspection result information, if the memory fault is detected by the memory inspection; and
      an event processing unit selector that selects an event processing unit to process the event from the plurality of event processing units using a storage area of the memory in which the memory fault does not occur, with reference to the inspection result information.

2. The computer according to claim 1,
   wherein the system control unit manages a memory map that stores an address range which specifies the storage areas of the memory used by the respective plurality of event processing units, and includes a memory inspection control unit that controls the execution of the inspection program on the basis of a determination result of the adjustment unit, and
   wherein the inspection unit includes an inspection target selection unit that specifies an address range to be inspected, with reference to the memory map.

3. The computer according to claim 2,
   wherein the inspection unit manages an inspection state holding unit that holds an execution state of the memory inspection, and
   wherein the system control unit includes an inspection waiting unit that delays a start of processing the event until the memory inspection is completed, on the basis of the execution state of the memory inspection acquired from the inspection state holding unit.

4. The computer according to claim 2,
wherein the adjustment unit manages importance information for holding a degree of importance for each of a plurality of events, and includes an importance determination unit that determines whether the inspection program needs to be executed, or not, on the basis of the importance information.

5. The computer according to claim 4,
wherein the adjustment unit manages time information for holding a time at which processing corresponding to a previous event is executed, for each of the plurality of events, and includes a frequency determination unit that calculates an elapsed time since a given event previously occurs until the given event again occurs, on the basis of the time information, and determines whether the inspection program needs to be executed, or not, on the basis of the calculated elapsed time.

6. The computer according to claim 2,
wherein the adjustment unit manages inspection necessity information for holding information indicative of whether the inspection program needs to be executed, or not, for each of a plurality of events, and
wherein the adjustment unit determines whether the inspection program needs to be executed, or not, with reference to the inspection necessity information.

7. A memory inspection method in a computer having a processor, a memory connected to the processor, and an I/O device connected to the processor,
wherein the memory stores a system software that realizes a system control unit for controlling the overall computer, and an inspection program that realizes an inspection unit for inspecting whether a memory fault is present in the memory, or not,
wherein the processor has a memory fault notifying unit that notifies the system control unit of a fault address which is an address of the memory at which the memory fault occurs when detecting the memory fault,
wherein the system control unit includes:
   a plurality of event processing units that process the event occurring while the system control unit is operating, with the use of different storage areas of the memory; and
   inspection result information for holding results of the memory inspection executed by the inspection unit on the storage areas of the memory used by the respective plurality of event processing units, the method comprising:
   a first step of determining whether the inspection program needs to be executed, or not, on the basis of the type of an event occurring during the operation of the system control unit, by the system control unit;
   a second step of specifying any one of the event processing units using a storage area of the memory including the fault address by the system control unit if the memory fault is detected by the memory inspection;
   a third step of recording the memory fault in the specified event processing unit in the inspection result information by the system control unit; and
   a fourth step of selecting any event processing unit to process the event from the plurality of event processing units using a storage area of the memory in which the memory fault does not occur, with reference to the inspection result information, by the system control unit.

8. The memory inspection method according to claim 7,
wherein the system control unit manages a memory map that stores an address range which specifies the storage areas of the memory used by the respective plurality of event processing units,
wherein the first step includes the steps of:
executing the inspection program by the system control unit if it is determined that the inspection program needs to be executed; and
specifying an address range to be inspected, with reference to the memory map, by the inspection unit.

9. The memory inspection method according to claim 8,
wherein the inspection unit manages an inspection state holding unit that holds an execution state of the memory inspection, and
wherein the method includes a step of delaying a start of processing the event until the memory inspection is completed, on the basis of the execution state of the memory inspection acquired from the inspection state holding unit, by the system control unit.

10. The memory inspection method according to claim 8,
wherein the system control unit manages importance information for holding the degree of importance for each of a plurality of events,
wherein in the first step, it is determined whether the inspection program needs to be executed, or not, on the basis of the importance information.

11. The memory inspection method according to claim 10,
wherein the system control unit manages time information for holding a time at which processing corresponding to a previous event is executed, for each of the plurality of events,
wherein the first step includes:
   a step of calculating an elapsed time since a given event previously occurs until the given event again occurs, on the basis of the time information; and
   a step of determining whether the inspection program needs to be executed, or not, on the basis of the calculated elapsed time.

12. The memory inspection method according to claim 8,
wherein the system control unit manages inspection necessity information for holding information indicative of whether the inspection program needs to be executed, or not, for each of a plurality of events, and
wherein in the first step, it is determined whether the inspection program needs to be executed, or not, with reference to the inspection necessity information.

* * * * *